(12) United States Patent
Lim et al.

(10) Patent No.: US 10,502,935 B2
(45) Date of Patent: Dec. 10, 2019

(54) IMAGE SENSOR MODULES AND LUMINAIRES INCORPORATING THE SAME

(71) Applicant: IDEAL Industries Lighting LLC, Sycamore, IL (US)

(72) Inventors: Jin Hong Lim, Durham, NC (US); John Roberts, Durham, NC (US); Steve Wilcenski, Cary, NC (US)

(73) Assignee: IDEAL INDUSTRIES LIGHTING LLC, Sycamore, IL (US)

( * ) Notice: Subject to any disclaimer, the term of this patent is extended or adjusted under 35 U.S.C. 154(b) by 186 days.

(21) Appl. No.: 15/449,126

(22) Filed: Mar. 3, 2017

(65) Prior Publication Data

US 2018/0252899 A1 Sep. 6, 2018

(51) Int. Cl.
  *G02B 13/18* (2006.01)
  *H04N 5/225* (2006.01)
  *G02B 13/08* (2006.01)
  *G03B 15/03* (2006.01)

(52) U.S. Cl.
  CPC .............. *G02B 13/18* (2013.01); *G02B 13/08* (2013.01); *G03B 15/03* (2013.01); *H04N 5/2256* (2013.01); *G03B 2215/0592* (2013.01)

(58) Field of Classification Search
  CPC ........ G02B 13/18; G02B 13/08; G03B 15/06; H04N 5/2256

USPC .......................................................... 359/642
See application file for complete search history.

(56) References Cited

U.S. PATENT DOCUMENTS

| 8,049,967 B2* | 11/2011 | Hirose | G02B 13/004 359/671 |
| 2016/0242252 A1* | 8/2016 | Lim | H05B 33/0854 |

* cited by examiner

*Primary Examiner* — James R Greece
(74) *Attorney, Agent, or Firm* — J. Clinton Wimbish; Nexsen Pruet, PLLC

(57) ABSTRACT

Asymmetrical lenses are provided having design to mitigate or eliminate field of view mismatch between image sensor modules and luminaires incorporating the image sensor modules. Briefly, an asymmetrical lens comprises an optical axis and a front surface comprising a first set of normal axes (x, y) in a plane normal to the optical axis and a negative radius of curvature or positive radius of curvature along each of the normal axes (x, y). The asymmetrical lens also comprises a back surface comprising a second set of normal axes (x', y') in the plane normal to the optical axis and a negative radius of curvature or positive radius of curvature along each of the normal axes (x', y'), wherein the asymmetrical lens has negative refractive power or positive refractive power in each of an x-axis and y-axis of an image plane of the asymmetrical lens.

28 Claims, 27 Drawing Sheets

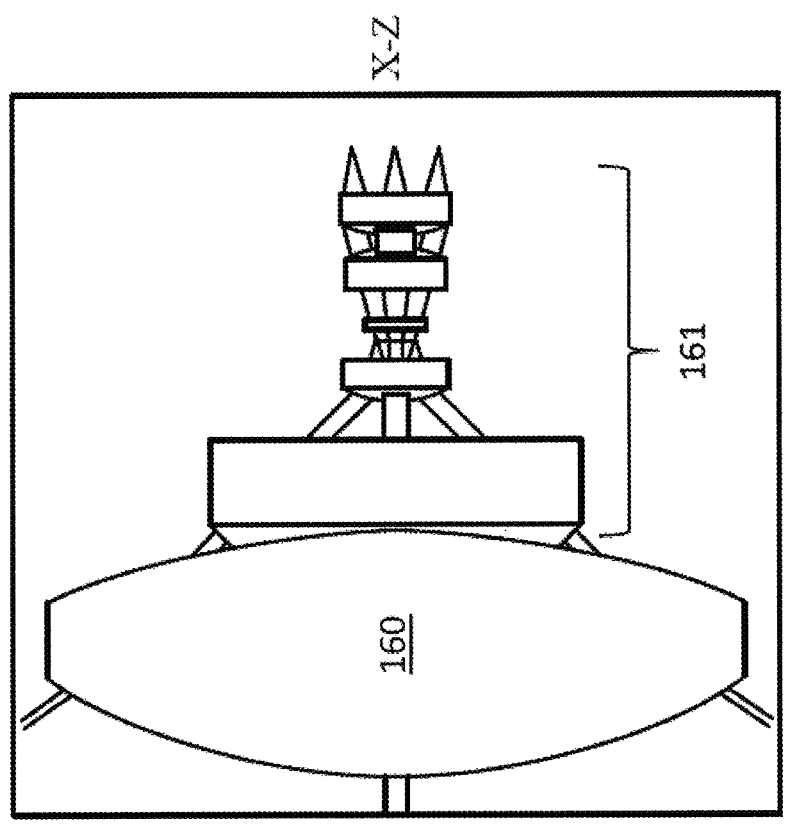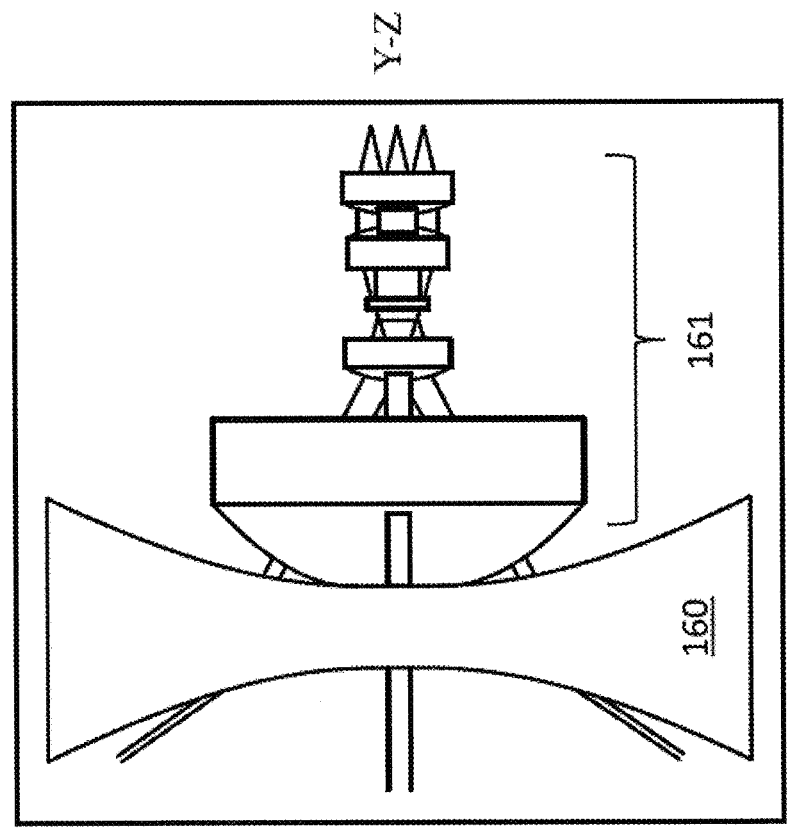
FIG. 16

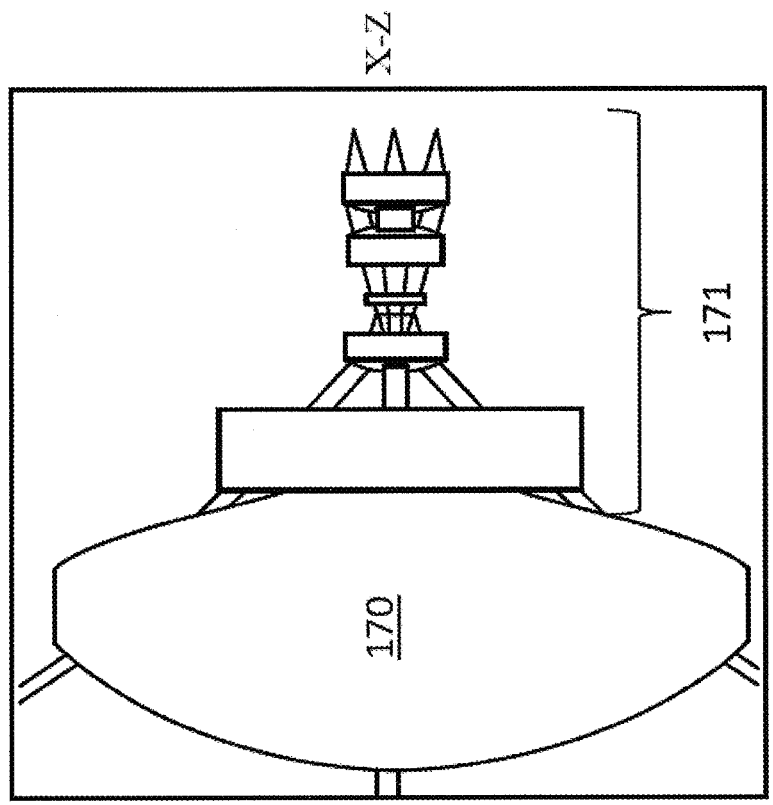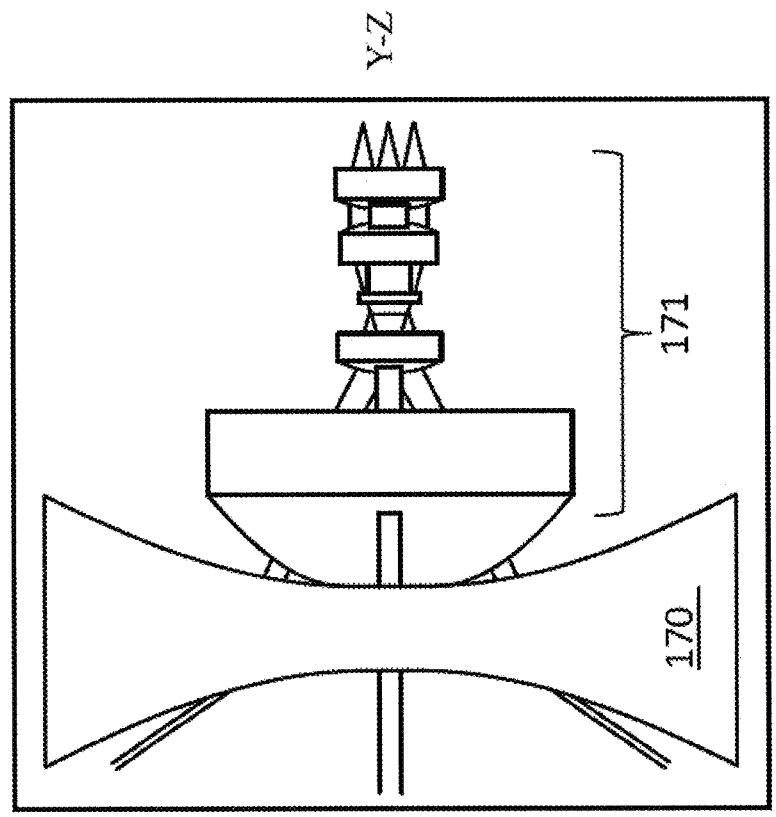
FIG. 17

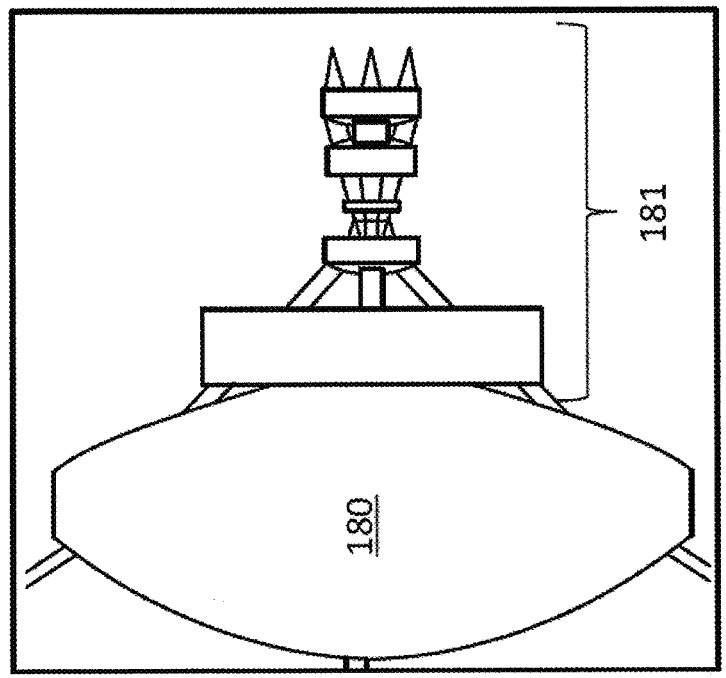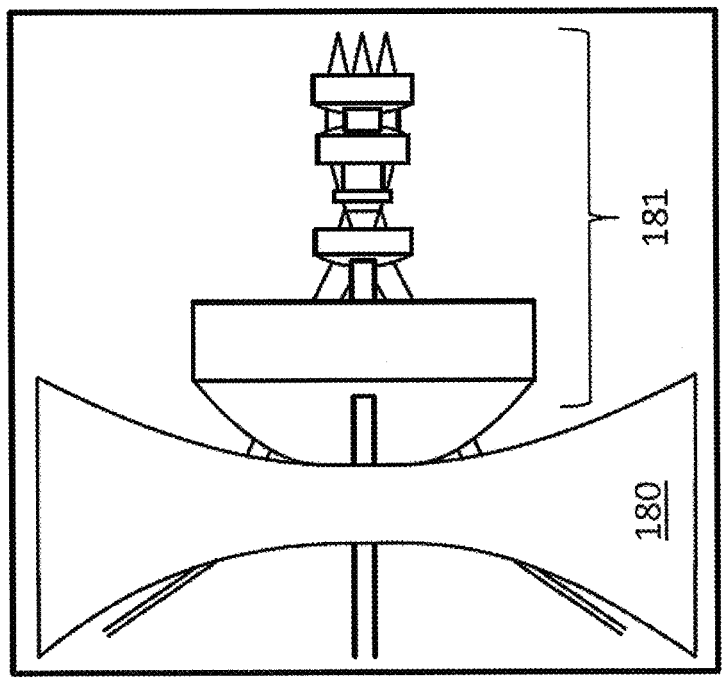
FIG. 18

IMAGE SENSOR MODULES AND LUMINAIRES INCORPORATING THE SAME

FIELD

The present invention relates to image sensor modules and, in particular, to image sensor modules comprising optics reconciling image sensor field of view and luminaire field of view.

BACKGROUND

Image sensors are employed in a variety of devices including cameras, satellites, astronomical imaging systems, surveillance systems, spectral analysis apparatus and telecommunication devices. Image sensors generally comprise a focal plane array and associated optics setting the array field of view. The optics, for example, are optimized to enable field of view over the entire surface of the focal plane array. Accordingly, image sensor optics can be largely dependent on focal plane array geometry. Focal plane arrays most commonly exhibit a rectangular format of the desired number of pixels. To reduce costs and enhance manufacturing efficiencies, several commercially available image sensors have standardized focal plane geometry and associated optics providing various field of view options.

For many applications, focal plane array geometry and field of view of commercially available sensor modules are disproportionate to field of view of devices in which the image sensor modules are incorporated. FIG. 1 generally illustrates disproportionate fields of view between an image sensor module and device incorporating the module. As illustrated in FIG. 1, the image sensor module has a rectangular field of view 11 differing in horizontal, vertical and diagonal directions. Device field of view is represented by the circle and is generally isotropic. Field of view mismatch illustrated in FIG. 1 presents several problems, including failure of the senor module to image the entire device field of view and the introduction of artifacts and/or noise generated by stray or reflected light striking the sensor module focal plane from one or more regions of field of view mismatch. These problems can result in the sensor module missing important detection events and/or registering artifacts as meaningful detection events, thereby compromising device responsiveness changes in imaged environment.

SUMMARY

In view of these problems and disadvantages, asymmetrical lenses are provided having design to mitigate or eliminate field of view mismatch between image sensor modules and luminaires incorporating the image sensor modules. In some embodiments, for example, an asymmetrical lens described herein alters field of view of an image senor module to less than or equal to an acceptance angle of a luminaire integrating the sensor module. Briefly, an asymmetrical lens comprises an optical axis and a front surface comprising a first set of normal axes (x, y) in a plane normal to the optical axis and a negative radius of curvature or positive radius of curvature along each of the normal axes (x, y). The asymmetrical lens also comprises a back surface comprising a second set of normal axes (x', y') in the plane normal to the optical axis and a negative radius of curvature or positive radius of curvature along each of the normal axes (x', y'), wherein the asymmetrical lens has negative refractive power or positive refractive power in each of an x-axis and y-axis of an image plane of the asymmetrical lens. In some embodiments, the asymmetrical lens has positive refractive power in the x-axis and negative refractive power in the y-axis of the image plane.

In another aspect, sensor modules for integration with luminaires are described herein. A sensor module, in some embodiments, comprises an image sensor and an optic assembly comprising an optical axis and an asymmetrical lens. The asymmetrical lens comprises a front surface comprising a first set of normal axes (x, y) in a plane normal to the optical axis and a negative radius of curvature or positive radius of curvature along each of the normal axes (x, y). The asymmetrical lens also comprises a back surface comprising a second set of normal axes (x', y') in the plane normal to the optical axis and a negative radius of curvature or positive radius of curvature along each of the normal axes (x', y'), wherein the asymmetrical lens has negative refractive power or positive refractive power in each of an x-axis and y-axis of an image plane of the asymmetrical lens. In some embodiments, the asymmetrical lens alters field of view of the image sensor to less than or equal to an acceptance angle of the luminaire integrating the sensor module.

In another aspect, luminaires incorporating sensor modules are described herein. A luminaire comprises a light emitting face and a sensor module integrated with the luminaire. The sensor module comprises an image sensor and an optic assembly comprising an optical axis and an asymmetrical lens. The asymmetrical lens comprises a front surface comprising a first set of normal axes (x, y) in a plane normal to the optical axis and a negative radius of curvature or positive radius of curvature along each of the normal axes (x, y). The asymmetrical lens also comprises a back surface comprising a second set of normal axes (x', y') in the plane normal to the optical axis and a negative radius of curvature or positive radius of curvature along each of the normal axes (x', y'), wherein the asymmetrical lens has negative refractive power or positive refractive power in each of an x-axis and y-axis of an image plane of the asymmetrical lens. As described further herein, negative and positive refractive power of the asymmetrical lens can be independently varied in the x-axis and y-axis of the image plane according to field of view requirements of the luminaire.

These and other embodiments are further described in the detailed description which follows.

BRIEF DESCRIPTION OF THE DRAWINGS

FIG. 16 illustrates ray traces for an asymmetric lens having the design provided in FIG. 8 in conjunction with a primary lens assembly according to some embodiments.

FIG. 17 illustrates ray traces for an asymmetric lens having the design provided in FIG. 9 in conjunction with a primary lens assembly according to some embodiments.

FIG. 18 illustrates ray traces for an asymmetric lens having the design provided in FIG. 10 in conjunction with a primary lens assembly according to some embodiments.

DETAILED DESCRIPTION

Figure 1:
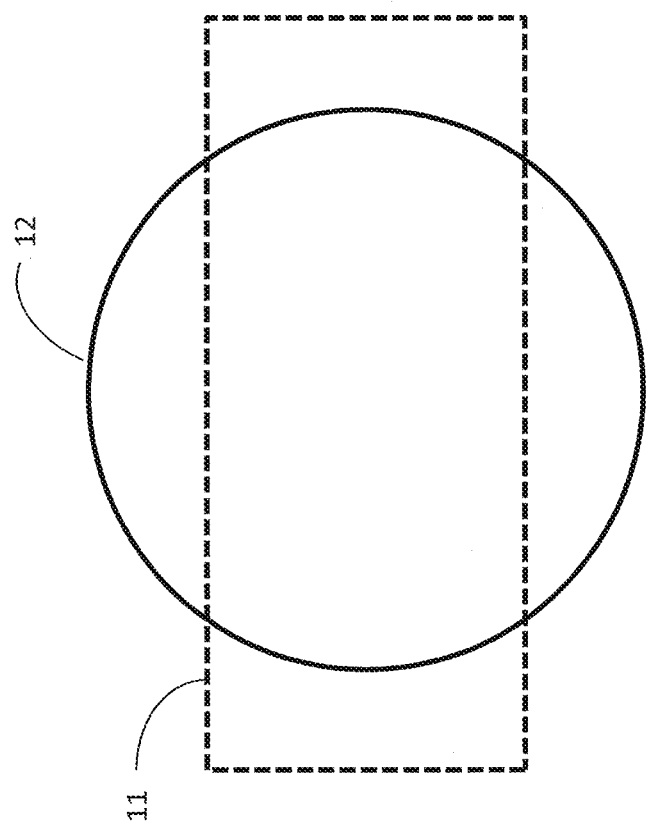
FIG. 1 illustrates field of view mismatch between an image sensor module and device incorporating the image sensor module in some embodiments.

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

I. Asymmetrical Lenses

Asymmetrical lenses are provided for mitigating or correcting field of view mismatch between image sensor modules and luminaires incorporating the modules. An asymmetrical lens described herein comprises an optical axis and a front surface comprising a first set of normal axes (x, y) in a plane normal to the optical axis and a negative radius of curvature or positive radius of curvature along each of the normal axes (x, y). The asymmetrical lens also comprises a back surface comprising a second set of normal axes (x', y') in the plane normal to the optical axis and a negative radius of curvature or positive radius of curvature along each of the normal axes (x', y'), wherein the asymmetrical lens has negative refractive power or positive refractive power in each of an x-axis and y-axis of an image plane of the asymmetrical lens.

Figure 2:
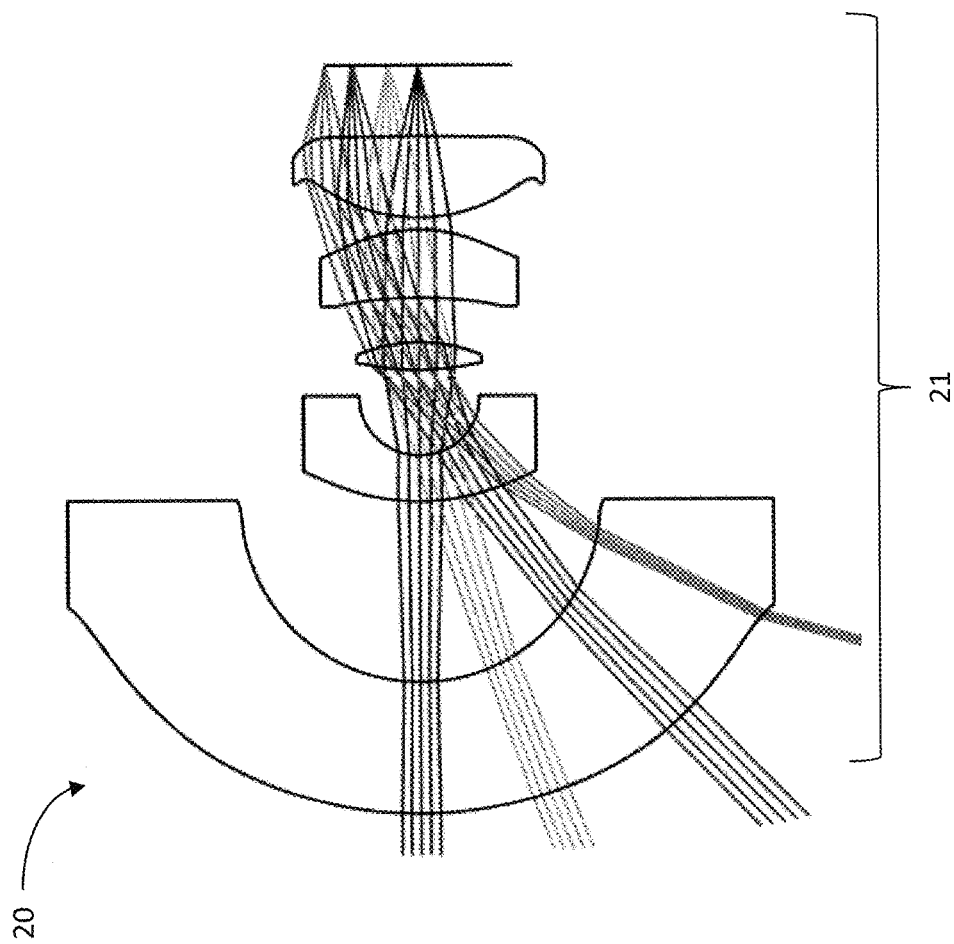
FIG. 2 illustrates a primary lens assembly of a sensor module according to some embodiments.

In some embodiments, the asymmetrical lens has negative refractive power in both the x-axis and y-axis of the image plane. For example, the front lens surface comprises negative radius of curvature along each of the first set of normal axes (x, y), and the back surface comprises negative radius of curvature along each set of the second set of normal axes (x', y'). Negative radius of curvature can differ between the normal axes (x, y) of the first set. Similarly, negative radius of curvature can differ between normal axes (x', y') of the second set. Moreover, the negative refractive power range in both the x-axis and the y-axis of the image plane can be −3000<fx/F<−8, −1000<fy/F<−5, wherein fx and fy are the focal length of the asymmetric lens in the x-axis and y-axis of the image plane, respectively, and F is focal length of the primary lens assembly of the image sensor module. Accordingly, values for negative refractive power can be the same or vary in the x and y-axes of the image plane. As described further herein, the primary lens assembly can comprise two or more rotationally symmetric lenses. FIG. 2 illustrates a primary lens assembly of a sensor module according to some embodiments. As illustrated in FIG. 2, the primary lens assembly 20 comprises several rotationally symmetric lenses 21 for setting the image sensor field of view.

Alternatively, refractive power of the asymmetrical lens differs in the x-axis and the y-axis of the image plane. As discussed further herein, refractive power in the x and y-axes of the image plane can be independently selected as positive or negative based on acceptance angle(s) of a luminaire relative to the image sensor field of view. In some embodiments, the asymmetrical lens has a negative refractive power in the x-axis and a positive refractive power in the y-axis of the image plane. In other embodiments, the asymmetrical lens has positive refractive power in the x-axis and negative refractive power in the y-axis of the image plane. In such embodiments, the front surface of the asymmetrical lens can comprise a negative radius of curvature normal to a positive radius of curvature along the first set of normal axes (x, y). The positive radius of curvature can be along the x-axis with the negative radius of curvature along the y-axis or vice versa. Similarly, the back surface can also comprise negative radius of curvature normal to positive radius of curvature along the second set of normal axes (x', y'). The positive radius of curvature can be along the x'-axis with the negative radius of curvature along the y'-axis or vice versa. Additionally, the positive refractive power in the x-axis of the image plane can be 100<fx/F<5000 and negative refractive power range in the y-axis of the image plane can ne −1000<fy/F<−5, where fx and fy are the focal length of the asymmetric lens in the x-axis and y-axis of the image plane, respectively, and F is the focal length of the primary lens assembly of the sensor module.

In addition to the positive and negative radii of curvature described herein, front and back surfaces of the asymmetrical lens comprise conic constants differing in normal orientations. The front surface can comprise conic constants differing in normal orientations, wherein individual values of the conic constants vary from −1 to 1. The back surface also comprises conic constants differing in normal orientations, wherein individual values of the conic constants can vary from −1 to 1.

Figure 3:
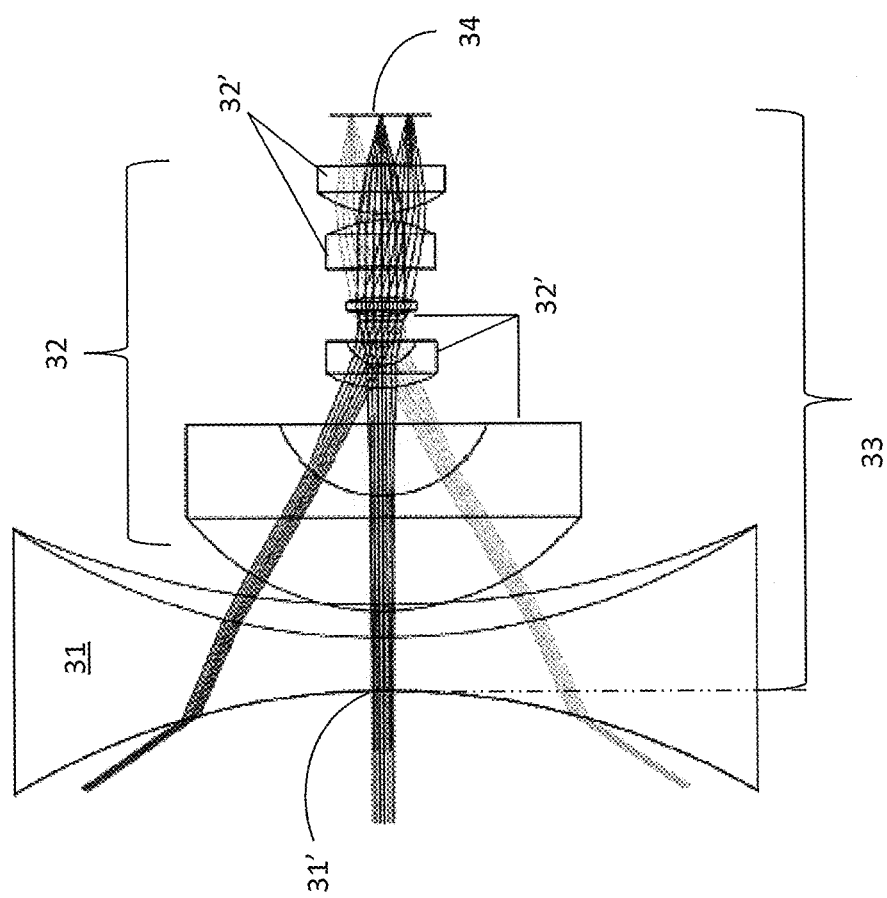
FIG. 3 illustrates an asymmetrical lens described herein in conjunction with a primary lens assembly of an image sensor module according to some embodiments.
Figure 4:
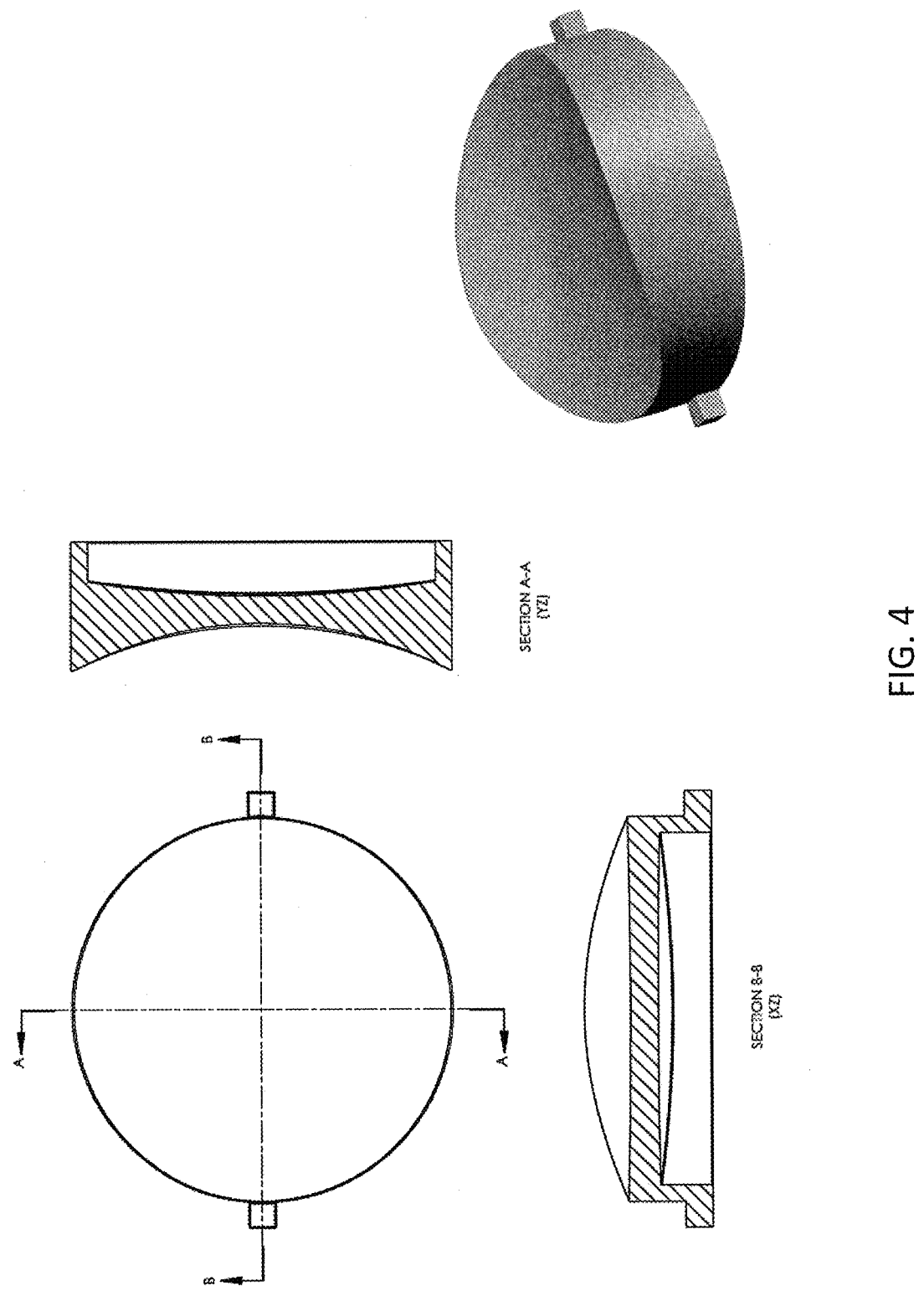
FIGS. 4-10 illustrate top plan views, XZ and YZ cross-sectional views and perspective views of various asymmetrical lenses having properties described herein according to some embodiments.
Figure 5:
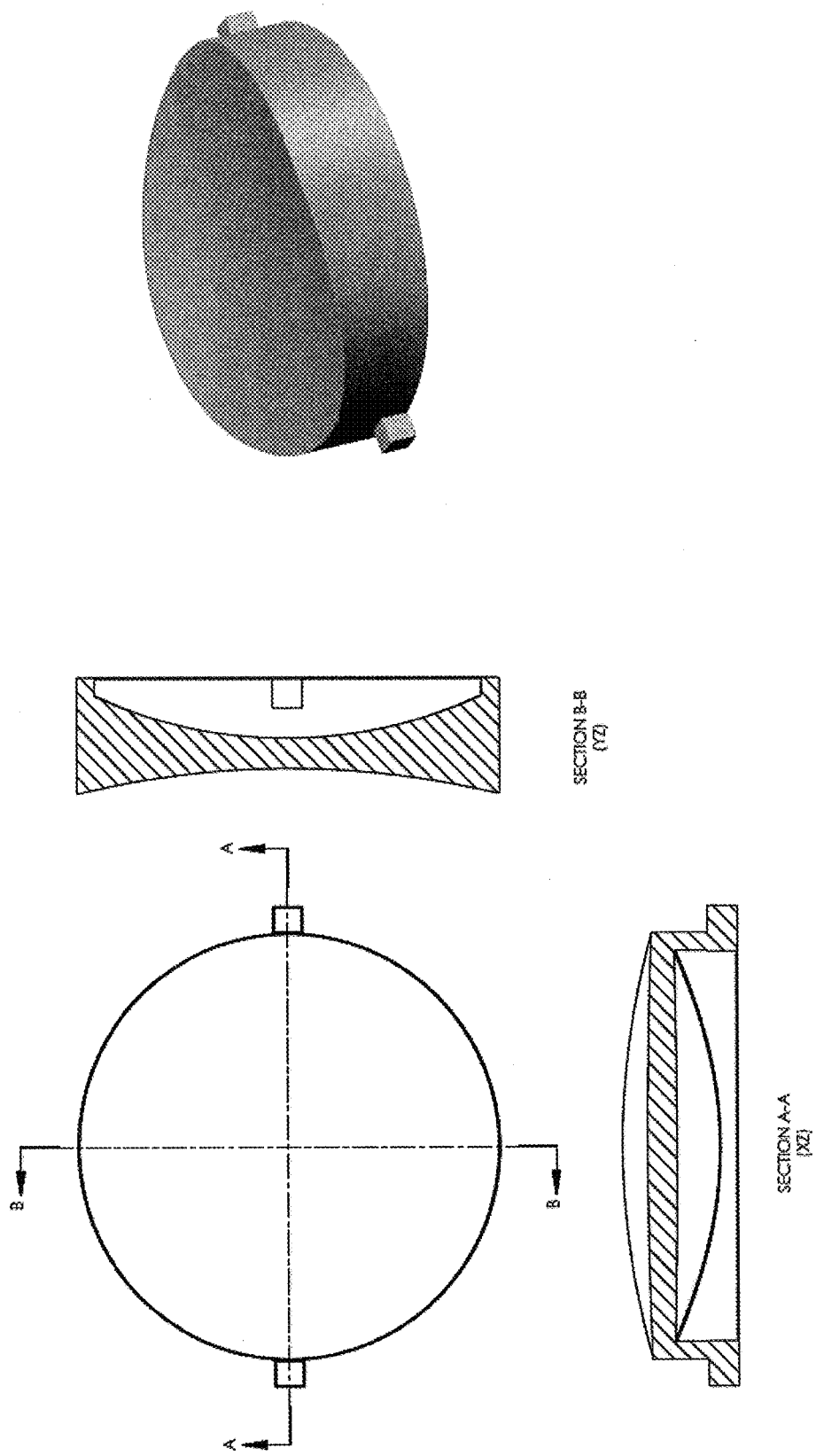
Figure 6:
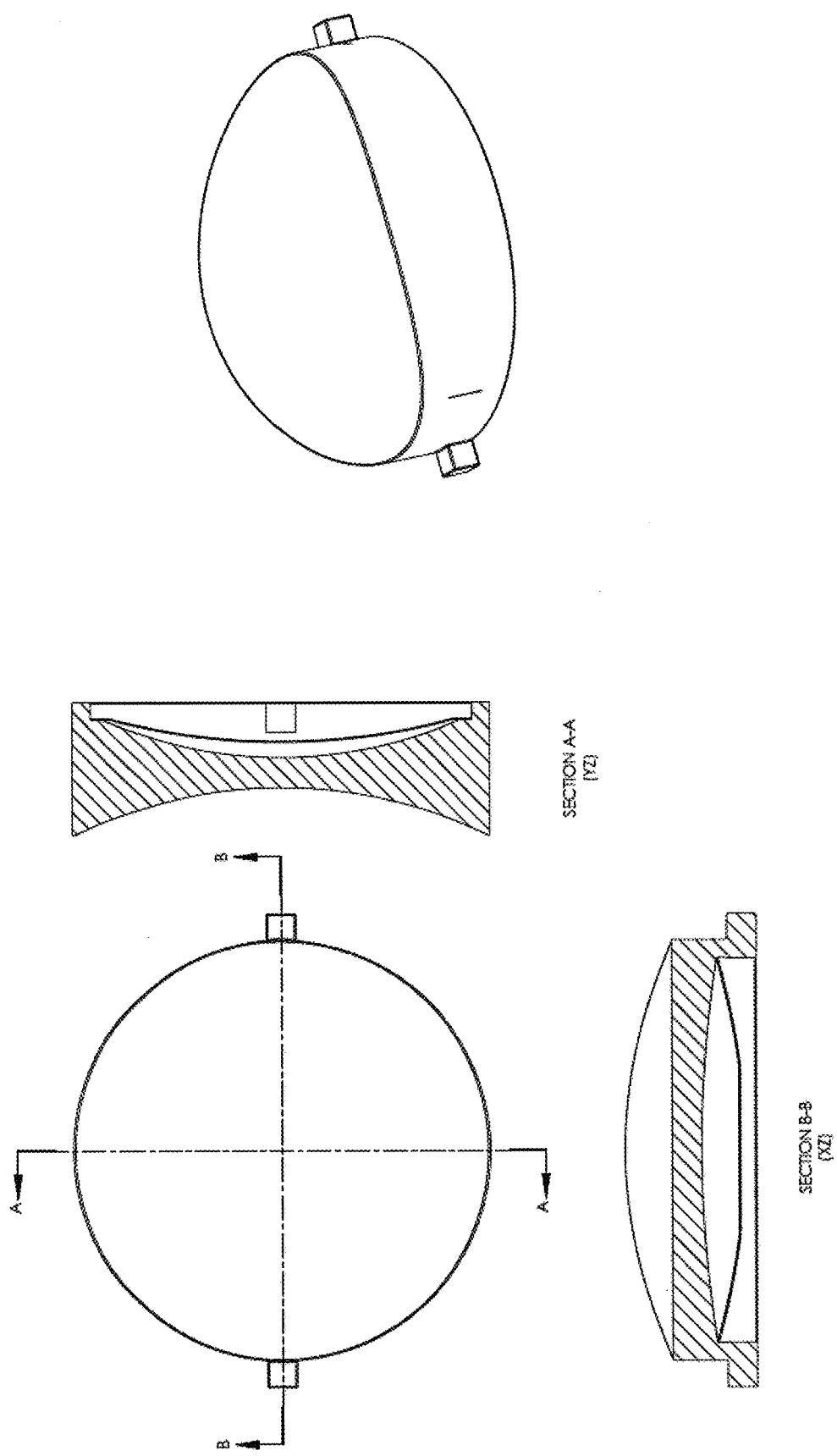
Figure 7:
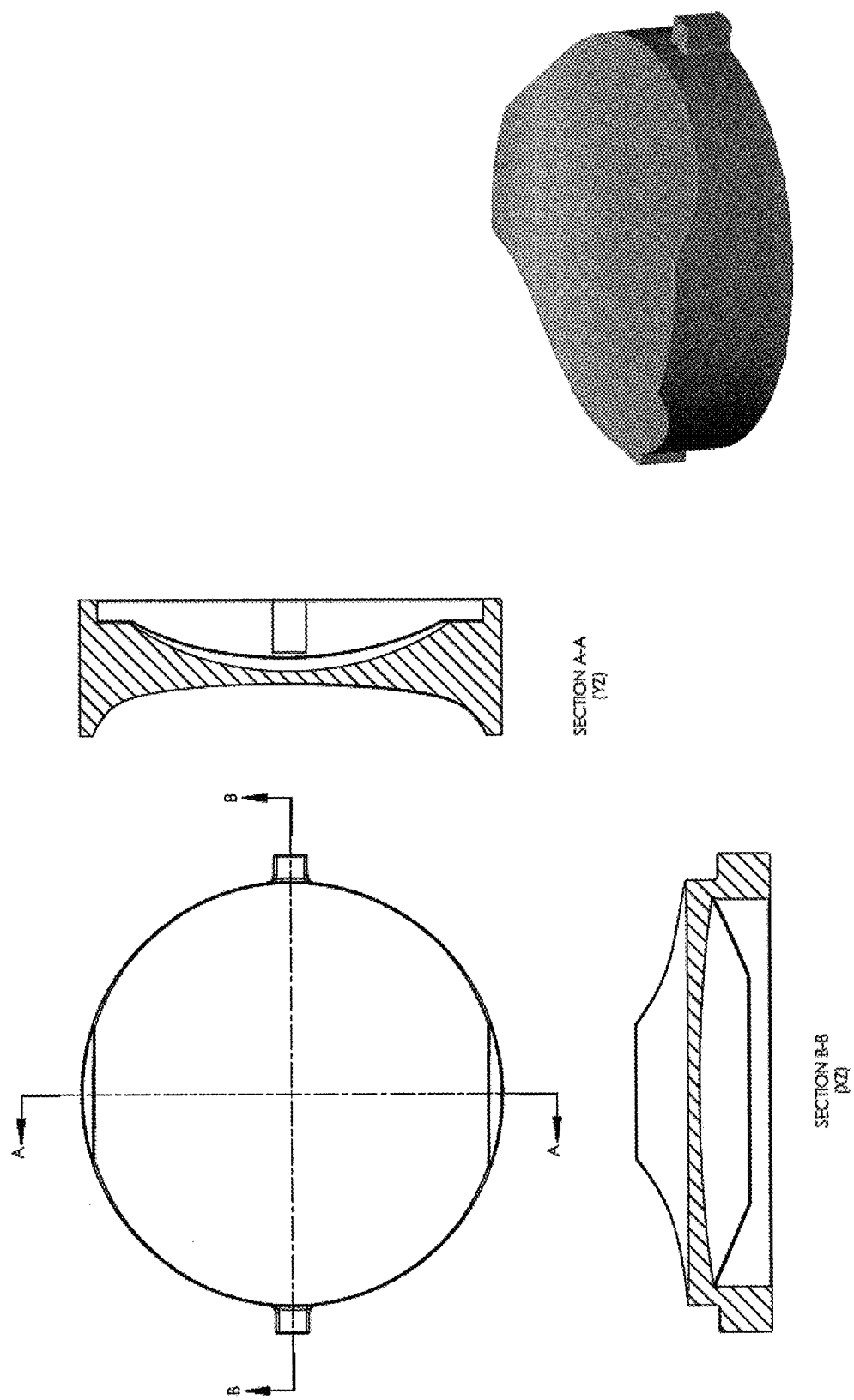

An asymmetric lens having any of the foregoing surface properties and refractive powers, in some embodiments, has a lens center thickness ($d_1$) satisfying the criterion of 0.007<$d_1$/L<0.2, where L is the total track length of the asymmetric lens and primary lens assembly of the image sensor module. FIG. 3 illustrates an asymmetrical lens described herein in conjunction with a primary lens assembly of an image sensor module according to some embodiments. As illustrated in FIG. 3, the asymmetrical lens 31 resides in front of the primary lens assembly 32 wherein the total track length 33 of the sensor module extends from center of the front surface 31' of the asymmetrical lens 31 to the image sensor 34. The primary lens assembly 32 comprises several rotationally symmetric lenses 32'. Additionally, the asymmetrical lens can have any spacing from the primary lens assembly not inconsistent with the objectives of the present invention. In some embodiments, for example, the spacing range of the asymmetrical lens and the primary lens assembly is 0.003<$d_2$/L<0.3, where $d_2$ is distance from the back surface of the asymmetrical lens to a front surface of the primary lens assembly, and L is total track length provided by the asymmetrical lens and primary lens assembly. Moreover, FIGS. 4-10 illustrate top plan views, XZ and YZ cross-sectional views and perspective views of various asymmetrical lenses having properties described herein according to some embodiments.

An asymmetric lens described herein can be made from any material not inconsistent with the objectives of the present invention. In some embodiments, an asymmetric lens is formed of glass or radiation transmissive polymeric material. Suitable radiation transmissive polymeric materials include acrylics or polycarbonates.

II. Luminaire Sensor Modules

In another aspect, sensor modules for integration with luminaires are described herein. A sensor module, in some embodiments, comprises an image sensor and an optic assembly comprising an optical axis and an asymmetrical lens. The asymmetrical lens comprises a front surface comprising a first set of normal axes (x, y) in a plane normal to the optical axis and a negative radius of curvature or positive radius of curvature along each of the normal axes (x, y). The asymmetrical lens also comprises a back surface comprising a second set of normal axes (x', y') in the plane normal to the optical axis and a negative radius of curvature or positive radius of curvature along each of the normal axes (x', y'), wherein the asymmetrical lens has negative refractive power or positive refractive power in each of an x-axis and y-axis of an image plane of the asymmetrical lens.

Figure 11B:
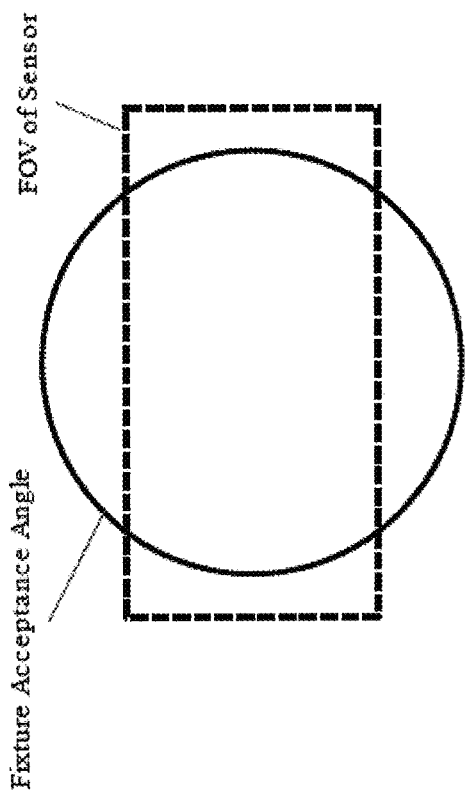
FIG. 11B illustrates mismatch between image sensor field of view and luminaire acceptance angle according to some embodiments.
Figure 11A:
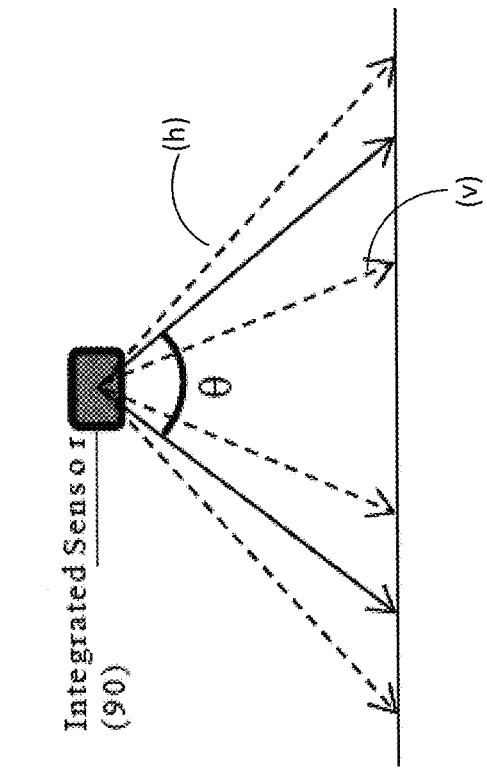
FIG. 11A generically illustrates an image sensor integrated with a luminaire according to some embodiments.
Figure 12:
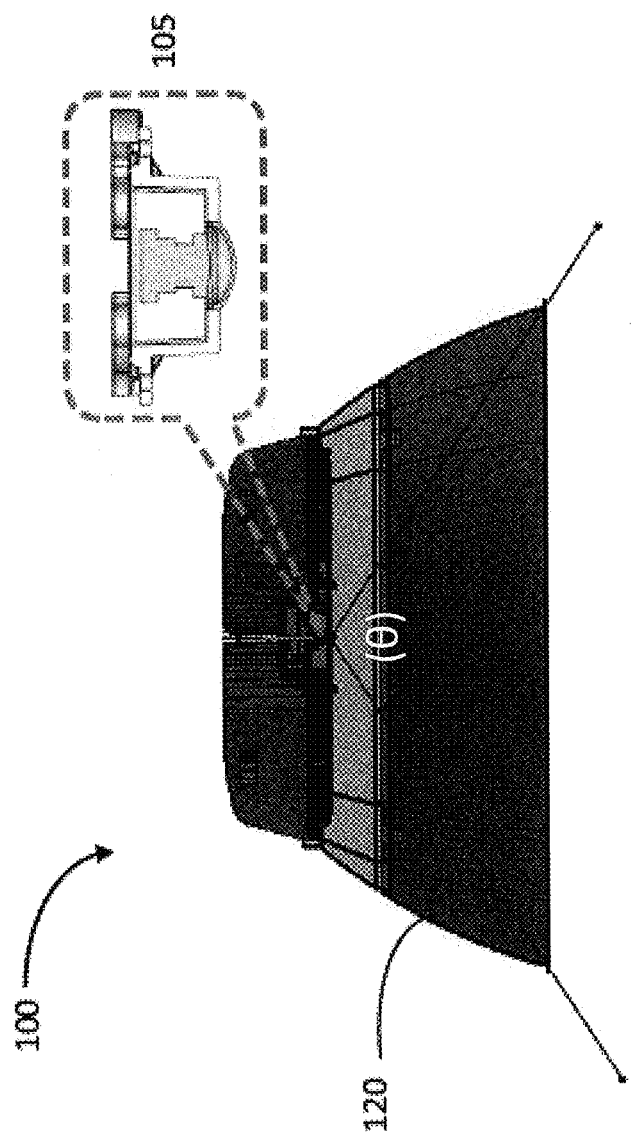
FIG. 12 illustrates some embodiments wherein an outer optic, such as a glare shield, sets acceptance angle (θ) of the luminaire.

Refractive power in the x and y-axes of the image plane can be independently selected as positive or negative based on acceptance angle(s) of a luminaire relative to the image sensor field of view provided by the primary lens assembly. In some embodiments, the asymmetrical lens alters field of view of the image sensor to less than or equal to an acceptance angle of the luminaire integrating the sensor module. FIG. 11A generically illustrates an image sensor 90 integrated with a luminaire. The dashed arrows correspond to image sensor 90 field of view in the horizontal (h) and vertical (v) directions. The image sensor 90 field of view is generally set by the primary lens assembly as provided in FIG. 2. The solid arrows correspond to an acceptance angle of the luminaire or lighting fixture in which the image sensor 90 is positioned. In the embodiment of FIG. 11A, the acceptance angle (θ) is set by a circular glare shield or circular outer reflective and/or refractive optic. FIG. 12 illustrates an embodiment wherein an outer optic 120, such as a circular glare shield, sets acceptance angle (θ) of the luminaire 100. FIG. 12 also illustrates central positioning of the image sensor module 105 at the vertex of the acceptance angle. Employing a circular optic can provide an isotropic acceptance, as illustrated in FIG. 11B. FIG. 11B also illustrates the rectangular field of view of the image sensor relative to the luminaire of fixture acceptance angle. Mismatch between the image sensor field of view and the field of view established by the luminaire acceptance angle is plainly seen in FIG. 11B. In the diagonal (d) and horizontal (h) dimensions, the luminaire acceptance angle restricts image sensor field of view. In such an arrangement, the image sensor may detect stray light and/or other artifacts reflected from the glare shield or optic(s) setting the acceptance angle. Such noise can induce false sensing events causing improper luminaire function. The image sensor, for example, may receive stray light causing the luminaire to turn-on or alter one or more of lighting intensity and color.

Referring again to FIG. 11B, image sensor field of view and luminaire acceptance angle are also mismatched in the vertical dimension. In particular, the luminaire acceptance angle extends beyond the image sensor field of view in the vertical dimension. In this situation, the image sensor may miss sensing events falling within the acceptance angle of the luminaire. Failure to detect such events can compromise the ability of the luminaire to respond to changes in the lighting environment. The luminaire, for example, may not respond to occupancy changes in the lighting environment, thereby precluding the luminaire from turning on when occupancy is detected and/or turning off when occupancy is no longer detected.

Figure 11D:
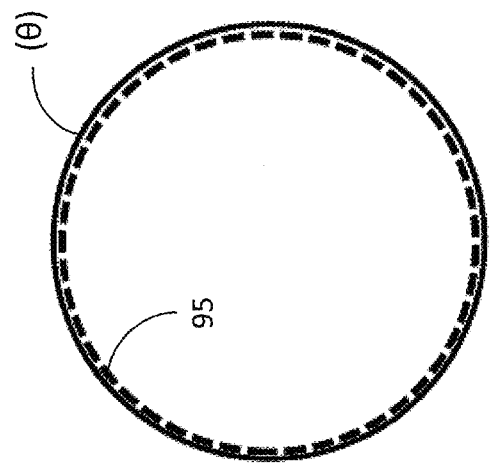
FIG. 11D illustrates a bottom plan view of reconciliation of image sensor field of view with luminaire acceptance angle according to some embodiments.
Figure 11C:
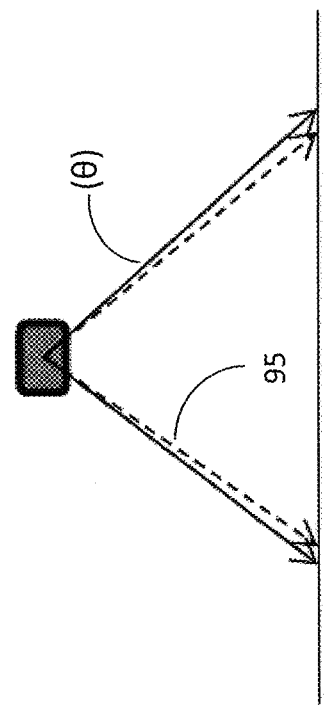
FIG. 11C illustrates an elevational view of reconciliation of image sensor field of view with luminaire acceptance angle according to some embodiments.

In view of the mismatch illustrated in FIGS. 11A and 11B, an asymmetrical lens can be employed with the optical assembly of the sensor module. The asymmetrical lens, for example, can be employed with the primary lens assembly of the sensor module. The asymmetrical lens alters the field of view of the image sensor to less than or equal to an acceptance angle of the luminaire integrating the sensor module. The asymmetrical lens can have any properties and/or features described in Section I herein. FIGS. 11C and 11D illustrate reconciliation of image sensor field of view with acceptance angle of the luminaire. The image sensor field of view 95 is now isotropic to match the isotropic acceptance angle ($\theta$) set by the glare shield or outer optic of the luminaire. As illustrated in FIG. 11D, the asymmetrical lens converged image sensor field of view along the x-axis and expanded image sensor field of view along the y-axis to substantially match acceptance angle of the luminaire. For example, the asymmetrical lens can comprise radius of curvatures and conic constants described above to have positive refractive power in the x-axis of the image plane and negative refractive power in the y-axis of the image plane.

As described in Section I above, positive and negative refractive power in the image plane is controlled by curvatures and geometries of the front and back surfaces of the asymmetrical lens. The asymmetrical lens can have varying design based on the mismatch between the image sensor field of view and acceptance angle of the luminaire. FIGS. 11A-11D have illustrated embodiments of a rectangular image sensor with an isotropic acceptance angle established by a circular glare shield or outer optic of the luminaire. However, asymmetrical lenses and principles described herein for altering field of view of the image sensor to less than or equal to an acceptance angle of the luminaire can be applied to image sensors of varying or non-isotropic geometry as well as acceptance angles established by glare shields and/or outer optics of varying geometry. In some embodiments, the image sensor of a module can be square or other polygonal shape. A square image sensor, for example, can be used with a circular glare shield or circular outer optic. In such embodiments, an asymmetric lens coupled to the sensor module can exhibit curvatures of symmetric shape along the square's symmetric axes. Field of view along x and y-axes of the square image sensor can be adjusted in a symmetrical manner. For corners of the square image sensor, the asymmetric lens can comprise freeform surfaces corresponding to points of the sensor.

In some embodiments, a glare shield or outer optic establishing acceptance angle of the luminaire is elliptical or polygonal. In such embodiments, the luminaire may comprise two or more acceptance angles depending on the specific geometry of the glare shield or outer optic. The asymmetric lens can alter the image sensor field of view to less than or equal to one or more of the acceptance angles set by the glare shield or outer optic. In some embodiments, the asymmetric lens alters image sensor field of view to less than or equal to all acceptance angles set by the glare shield or outer optic. In some embodiments, the sensor module comprises a rectangular image sensor, such as that illustrated in FIG. 11B. The luminaire integrating the sensor module can comprise a glare shield or outer optic having an elliptical cross-sectional geometry. An asymmetric lens can be used in conjunction with the optical assembly of the sensor module to alter image sensor field of view to less than or equal to acceptance angle(s) set by the elliptical glare shield or outer optic. For example, if the long axis of the elliptical glare shield is parallel to the long axis of the rectangular image sensor, curvature of the asymmetrical lens may be smoothly varied or circular symmetric along the x and y-axes depending on the extinction ratio of the elliptical shape and rectangular image sensor. Alternatively, if the elongated axis of the elliptical glare shield or outer optic is normal to the long axis of the rectangular image sensor, radii of curvature of the asymmetric lens requires significant modification. Horizontal curvature of the lens would decrease while vertical curvature of the lens would increase to match field of view of the image sensor with the elliptical glare shield or outer optic. For corners of the rectangular sensor, lens surfaces corresponding to independent fields are adjusted by ray tracing with freeform, while maintaining the curvatures determined for the horizontal and vertical directions.

In some embodiments, the glare shield or outer optic can be polygonal such as square, rectangular, hexagonal or octagonal. An asymmetric lens can be used in conjunction with the optical assembly of the sensor module to alter image sensor field of view to less than or equal to acceptance angle(s) set by the polygonal glare shield or outer optic. Surfaces of the asymmetrical lens and associated positive and/or negative refractive powers may be adjusted as described herein to reconcile image sensor field of view with one or more acceptance angles of the glare shield or outer optic.

Acceptance angle(s), in some embodiments, can also be established by optic(s) in addition to or independent from a glare shield or outer optic of the luminaire In some embodiments, one or more optics residing within the glare shield or outer optic of the luminaire can participate in setting luminaire acceptance angle. For example, an interior optic of circular, elliptical or polygonal cross-sectional geometry may restrict acceptance angle(s) beyond that of a glare shield or outer reflective and/or refractive optic. Asymmetric lens design structures and principles described above can be used to alter image sensor field of view to less than or equal to acceptance angles set by one or more interior optics.

Figure 13B:
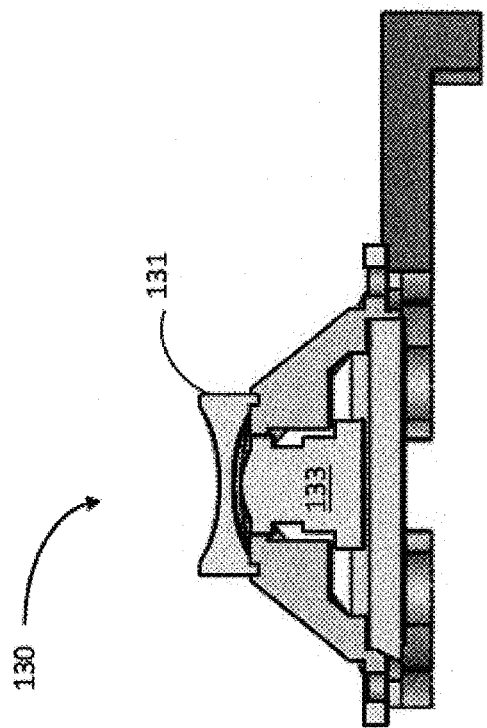
FIG. 13B illustrates a cross-sectional view of the asymmetric lens and sensor module of FIG. 13A.
Figure 13A:
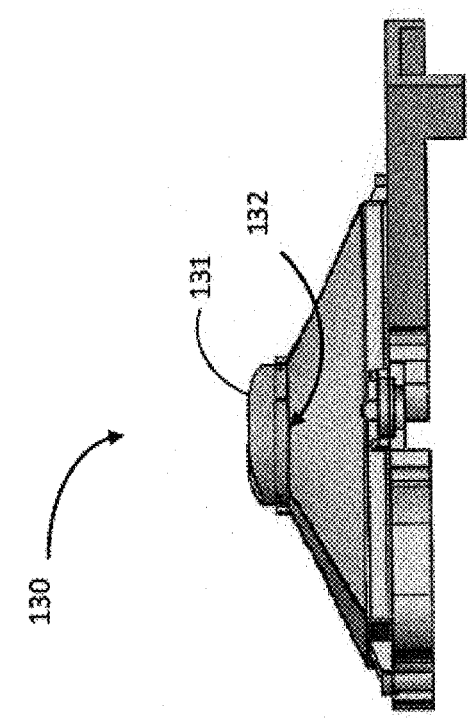
FIG. 13A illustrates a sensor module wherein an asymmetric lens is coupled over the optical aperture of the module according to some embodiments.
Figure 14B:
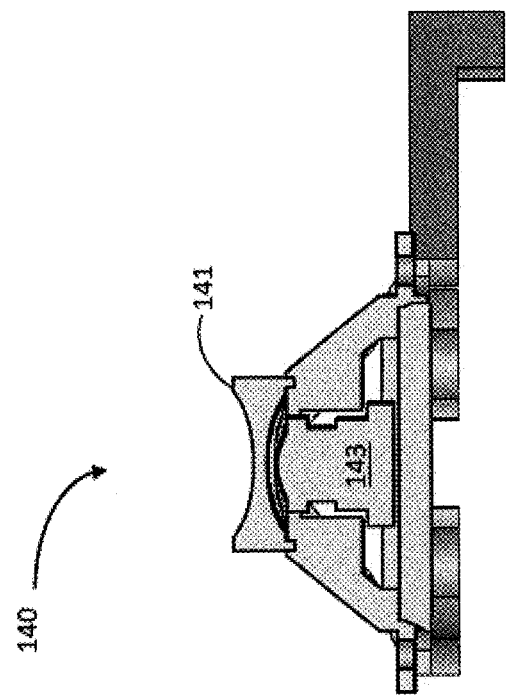
FIG. 14B illustrates a cross-sectional view of the asymmetric lens and sensor module of FIG. 14A.
Figure 14A:
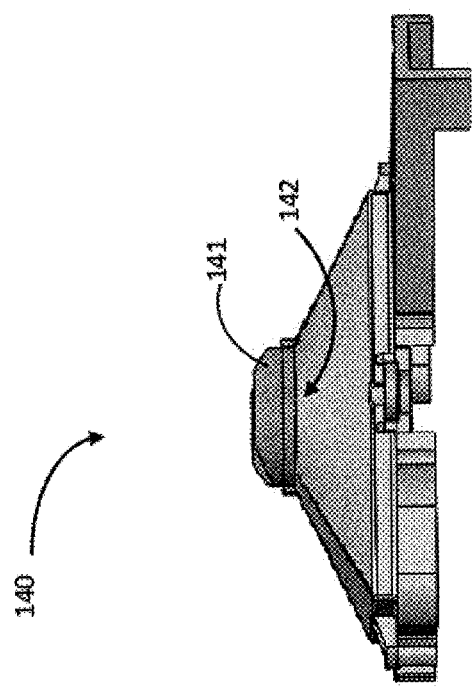
FIG. 14A illustrates a sensor module wherein an asymmetric lens is coupled over the optical aperture of the module according to some embodiments.
Figure 15B:
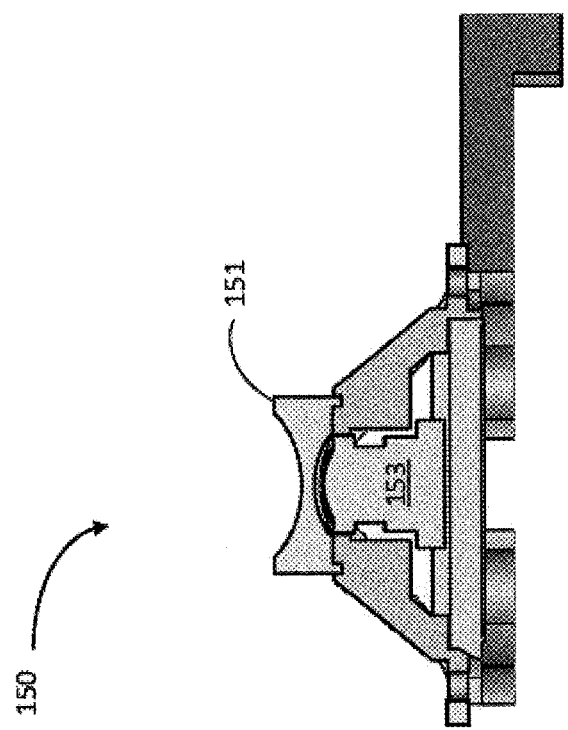
FIG. 15B illustrates a cross-sectional view of the asymmetric lens and sensor module of FIG. 14A.
Figure 15A:
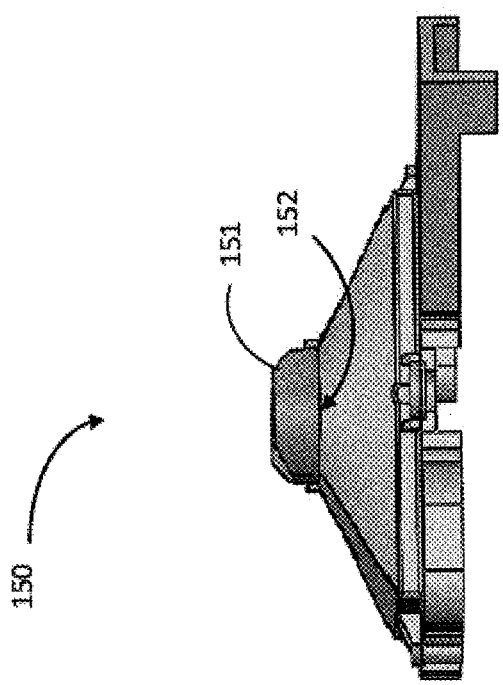
FIG. 15A illustrates a sensor module wherein an asymmetric lens is coupled over the optical aperture of the module according to some embodiments.

As set forth herein, an asymmetrical lens can work in conjunction with the primary lens assembly to reconcile image sensor field of view to one or more acceptance angles of a luminaire. In some embodiments, an asymmetrical lens can be positioned in front of the primary lens assembly of a sensor module. Placing the asymmetric lens in front of the primary lens assembly can facilitate modification of commercially available sensor modules to meet acceptance angle specifications of various luminaire constructions. FIG. 13A illustrates a sensor module 130 wherein an asymmetric lens 131 is coupled over the optical aperture 132 of the module 130 according to some embodiments. FIG. 13B illustrates a cross-sectional view of the asymmetric lens and sensor module of FIG. 13A. As provided in FIG. 13B, the asymmetric lens 131 resides over the primary lens assembly 133. Similarly, FIGS. 14A, 14B, 15A and 15B illustrate sensor modules 140, 150 comprising asymmetric lenses 141, 151 having different surface curvatures positioned over primary lens assemblies 143, 153 according to some embodiments.

Figure 8:
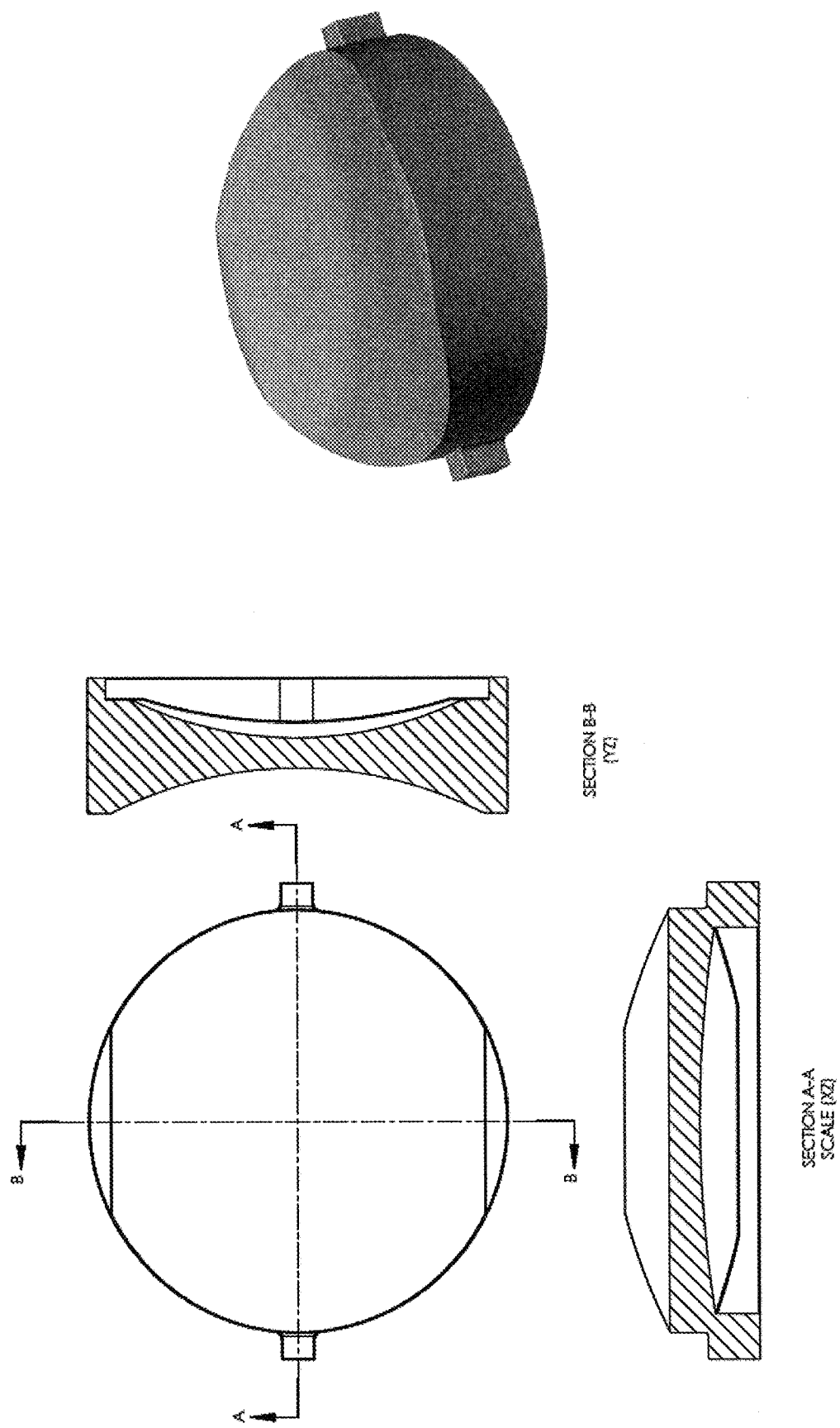
Figure 9:
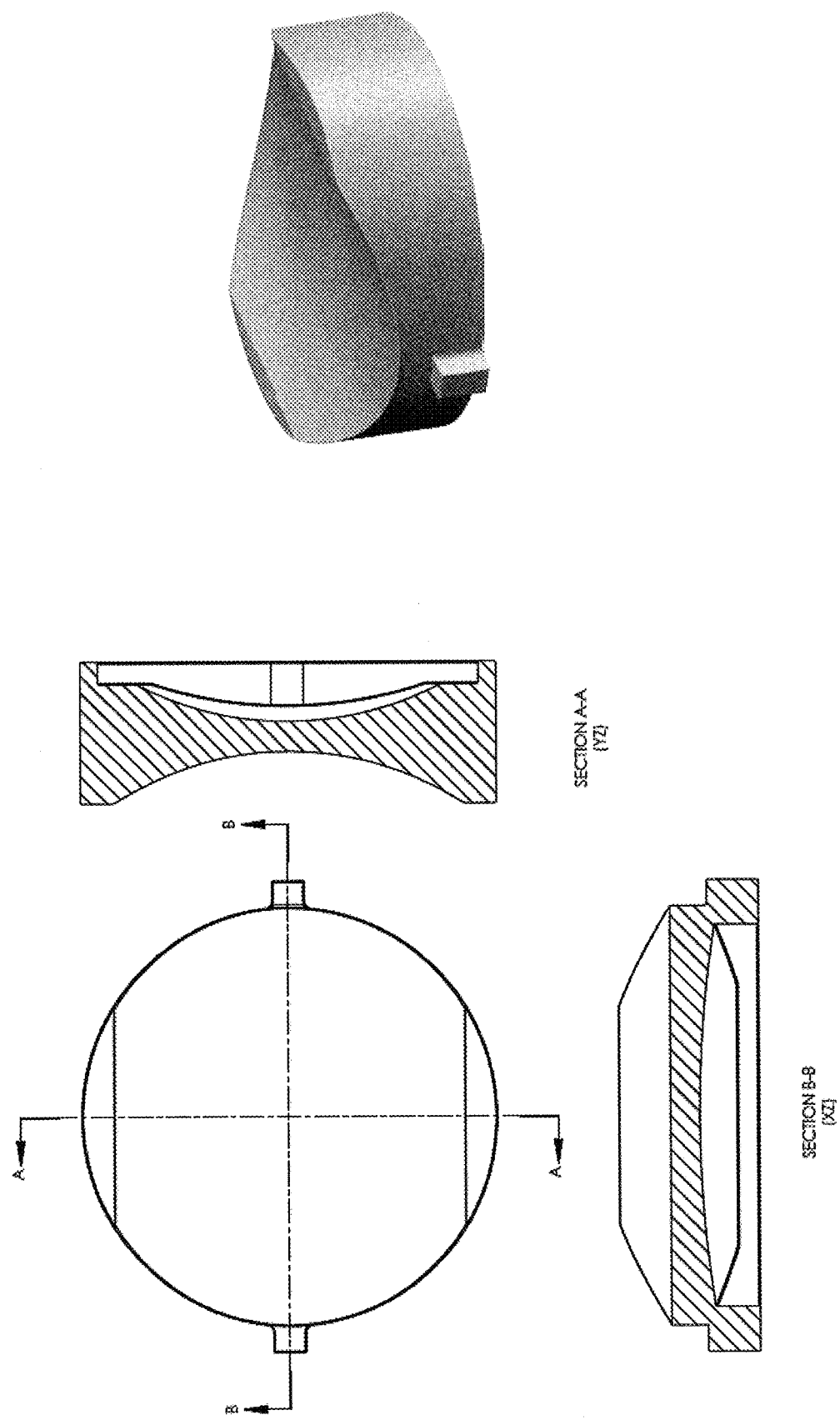
Figure 10:
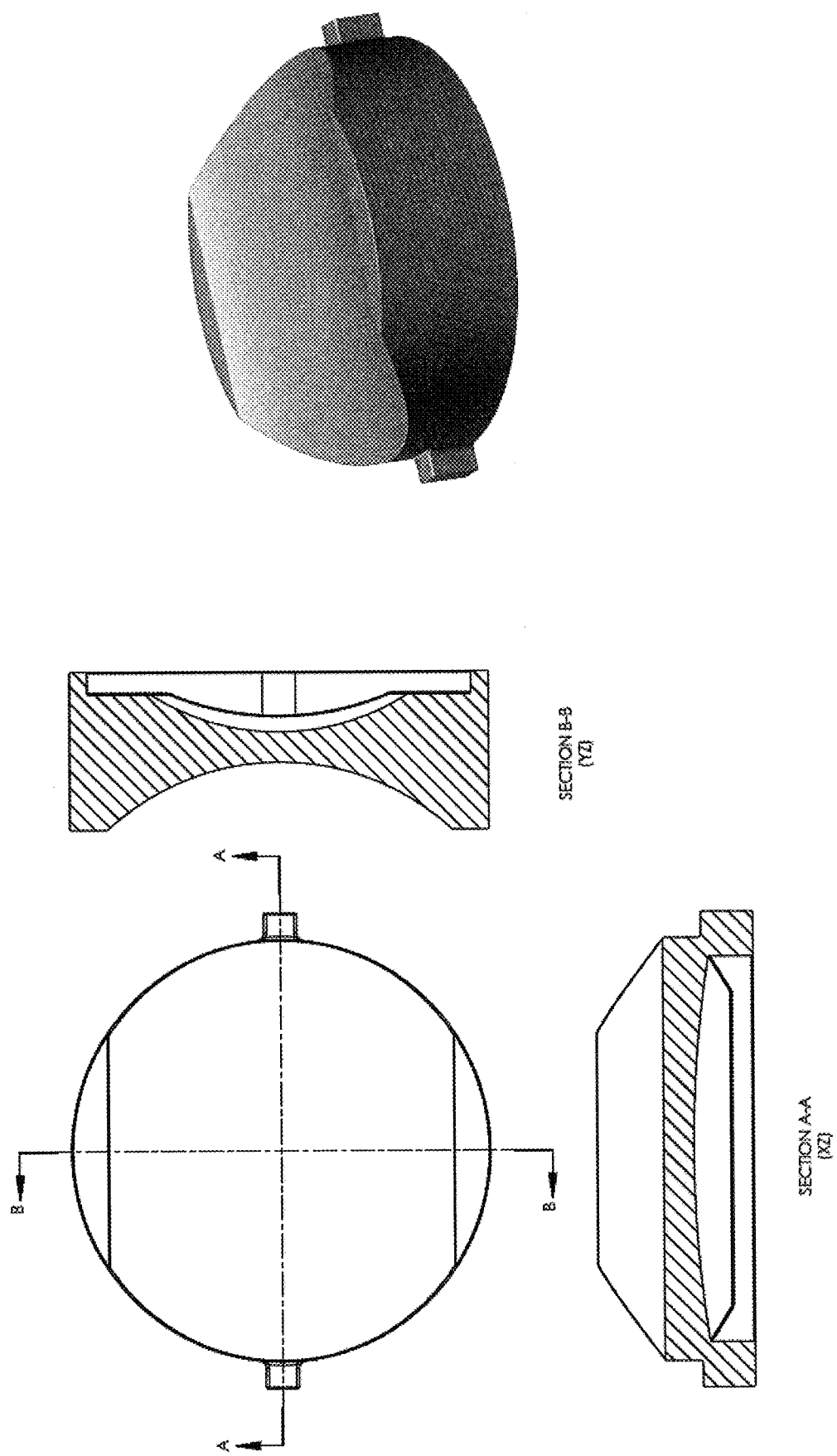

FIG. 16 illustrates ray traces for an asymmetric lens having the design provided in FIG. 8 in conjunction with a primary lens assembly according to some embodiments. As illustrated in FIG. 16, ray traces for YZ and XZ views of the asymmetric lens 160 are provided. The YZ and XZ views also illustrate the rotational symmetry of lenses of the primary lens assembly 161. Similarly, FIG. 17 illustrates ray traces for an asymmetric lens having the design provided in FIG. 9 in conjunction with a primary lens assembly according to some embodiments. FIG. 18 illustrates ray traces for an asymmetric lens having the design provided in FIG. 10 in conjunction with a primary lens assembly according to some embodiments. As with FIG. 16, YZ and XZ views of the asymmetric lenses 170, 180 are provided in conjunction with the primary lens assemblies 171, 181.

Image sensors or focal plane arrays of sensor modules described herein can have any construction not inconsistent with the objectives of the present invention. In some embodiments, an image sensor or focal plane array comprises a complimentary metal oxide semiconductor (CMOS) construction. Alternatively, the image sensor can be comprise a charge coupled device (CCD) architecture. Appropriate image sensors may include those made by the Aptina division of On Semiconductor, by Ominivsion or others. As described herein, an image sensor may have any desired shape including, but not limited to, rectangular, square or other polygonal shape. The image sensor may also have any desired number of pixels. Pixel number can be selected according to several considerations including sensor size, shape and desired resolution. The image sensor can be sensitive to light in any desired region of the electromagnetic spectrum. For example, the image sensor may be sensitive to visible light, infrared light, ultraviolet light and any combinations thereof. In one embodiment, for example, the image sensor may image in the visible and near infrared regions of the electromagnetic spectrum. Details of a CMOS-based image sensor are illustrated in the non-limiting embodiment of FIG. 25.

III. Luminaires Comprising Sensor Modules

In another aspect, luminaires incorporating sensor modules are described herein. A luminaire comprises a light emitting face and a sensor module integrated with the luminaire. The sensor module comprises an image sensor and an optic assembly comprising an optical axis and an asymmetrical lens. The asymmetrical lens comprises a front surface comprising a first set of normal axes (x, y) in a plane normal to the optical axis and a negative radius of curvature or positive radius of curvature along each of the normal axes (x, y). The asymmetrical lens also comprises a back surface comprising a second set of normal axes (x', y') in the plane normal to the optical axis and a negative radius of curvature or positive radius of curvature along each of the normal axes (x', y'), wherein the asymmetrical lens has negative refractive power or positive refractive power in each of an x-axis and y-axis of an image plane of the asymmetrical lens. As described herein, negative and positive refractive power of the asymmetrical lens can be independently varied in the x-axis and y-axis of the image plane according to field of view requirements of the luminaire. In some embodiments, a luminaire described herein has properties and architecture disclosed in U.S. patent application Ser. No. 15/018,606, filed Feb. 8, 2016 by Bendtsen et al., or U.S. patent application Ser. No. 15/181,065, filed Jun. 13, 2016 by Bendtsen et al., the disclosures of which are hereby incorporated by reference herein.

Figure 19:
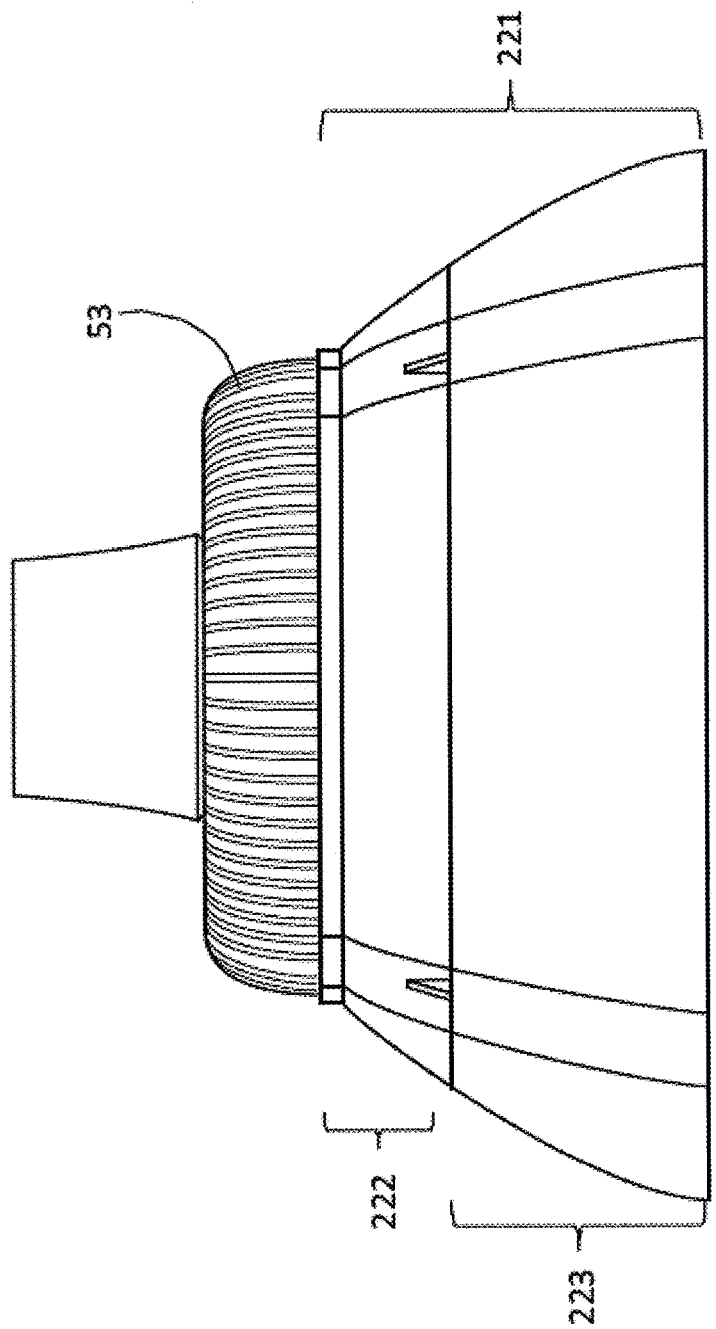
FIG. 19 illustrates an elevational view of a luminaire incorporating a glare shield according to one embodiment.

Acceptance angle(s) of the luminaire can be defined by an optical element such as a glare shield or refractive and/or reflective outer optical element. FIG. 19 illustrates an elevational view of a luminaire incorporating a glare shield according to one embodiment. The glare shield 221 in the embodiment of FIG. 19 comprises an upper segment 222 and a lower segment 223. The upper segment 222 can be clear or slightly diffuse while the lower segment 223 is heavily diffuse or opaque. Moreover, the lower segment 223 can include a reflective shelf at the interface with the upper segment 222 for redirecting a portion of light upward. The upper and lower segments can be formed of any desired material including clear or translucent polymeric materials, such as acrylic or polycarbonate. Opaque segments of the glare shield can be made of opaque polymeric material or metal, such as aluminum. In some embodiments, the upper 222 and lower 223 segments are formed of the same material. In other embodiments, the upper 222 and lower 223 segments are faulted of different materials. The upper 222 and lower 223 segments can also have the same cross-sectional shape or different cross-sectional shape. The upper segment 222, for example, can be generally polygonal, such as square, while the lower segment 223 is round or elliptical.

Figure 20:
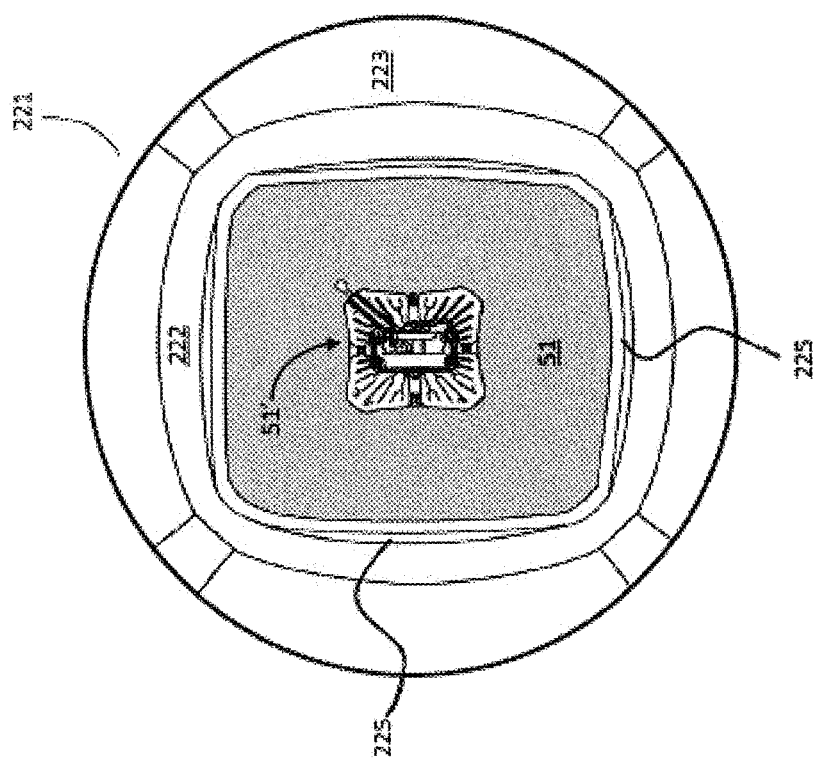
FIG. 20 illustrates a bottom plan view of the luminaire of FIG. 19.

FIG. 20 illustrates a bottom plan view of the luminaire of FIG. 19. As illustrated in FIG. 20, the upper segment 222 of the glare shield is square and transitions into a round bottom segment 223. The square upper segment 222 engages vertices of the LED assembly 51 and/or LED heatsink 53. In some embodiments, one or more gaps 225 are created between the glare shield and LED assembly 51 permitting air flow into perimeter regions of the LED heatsink 53. Depending on positioning of the sensor module in the luminaire, the upper polygonal segment 222 or lower round or elliptical segment 223 of the glare shield 221 may set acceptance angle(s) of the luminaire.

Figure 21:
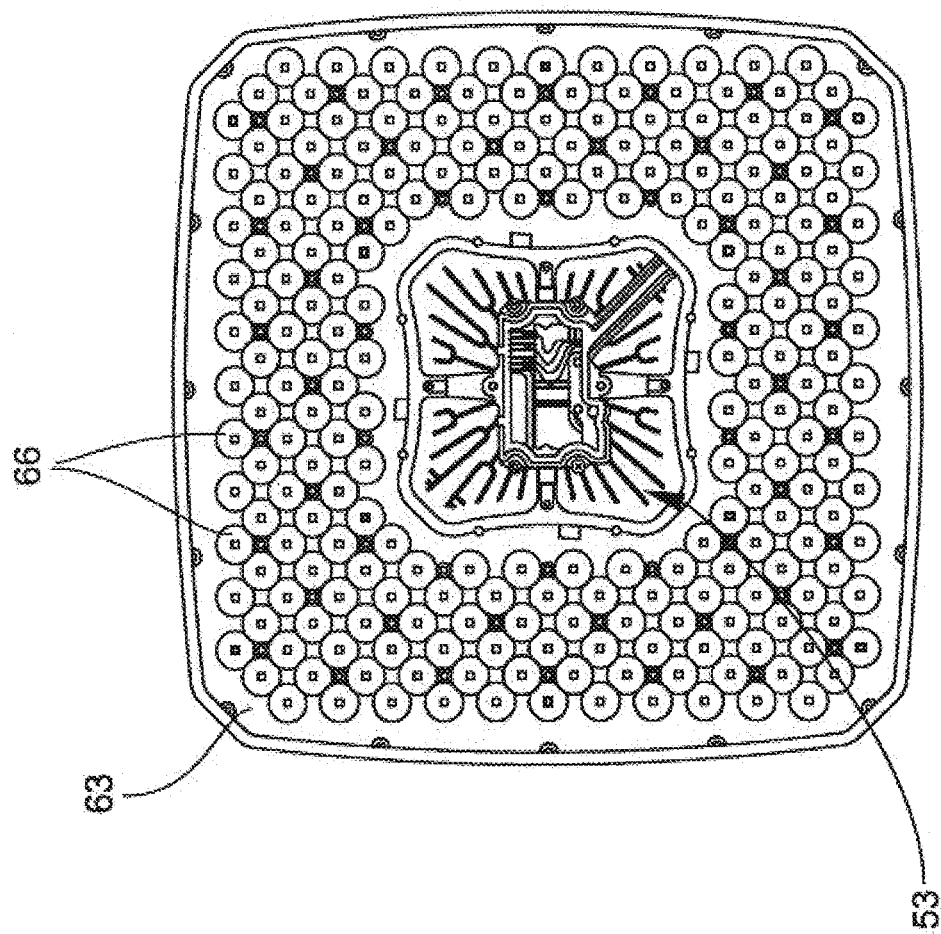
FIG. 21 illustrates a light emitting diode (LED) assembly of a luminaire according to some embodiments.
Figure 22:
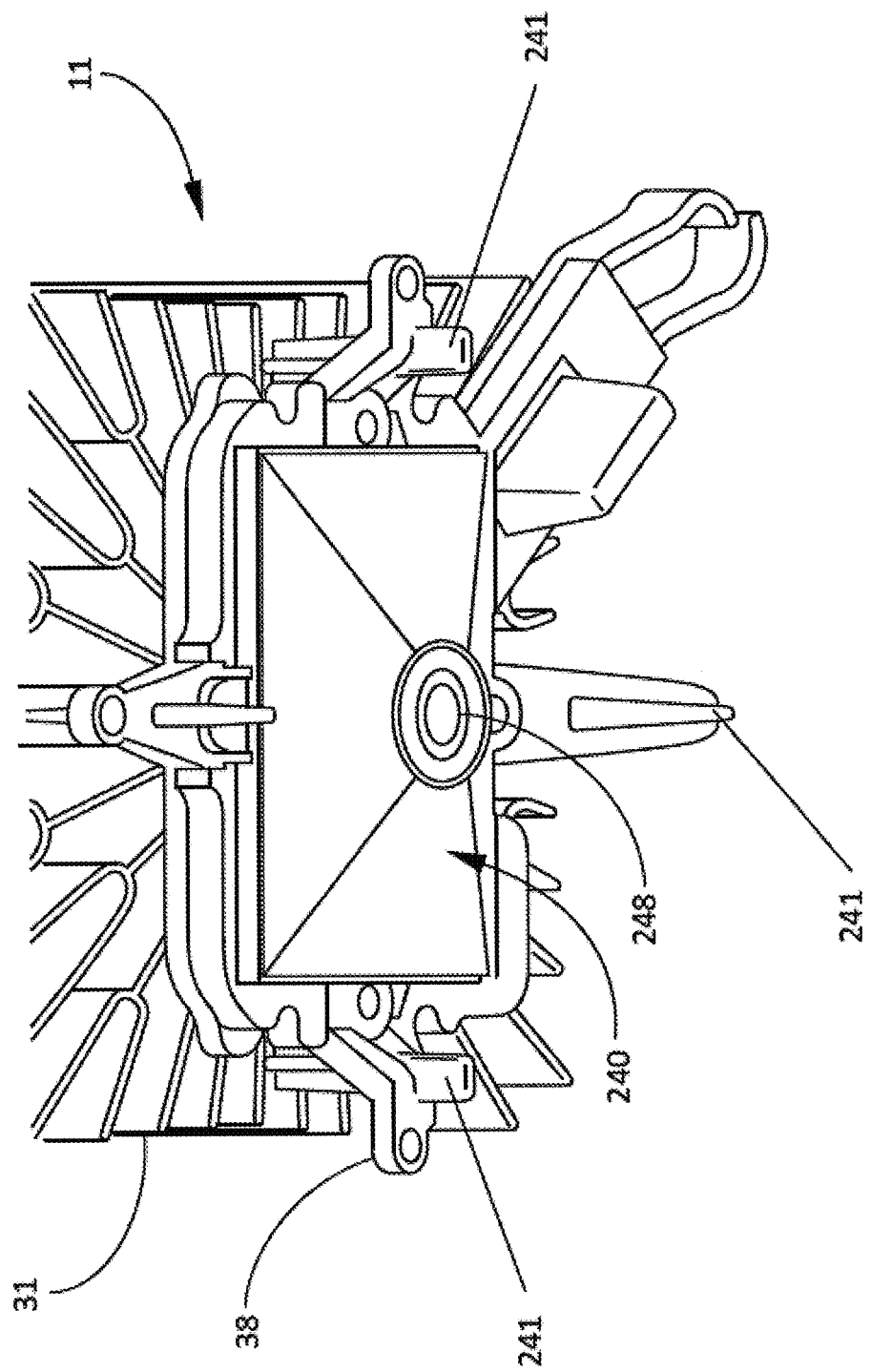
FIG. 22 illustrates a perspective view of a sensor module connecting directly with the driver assembly according to some embodiments.
Figure 23:
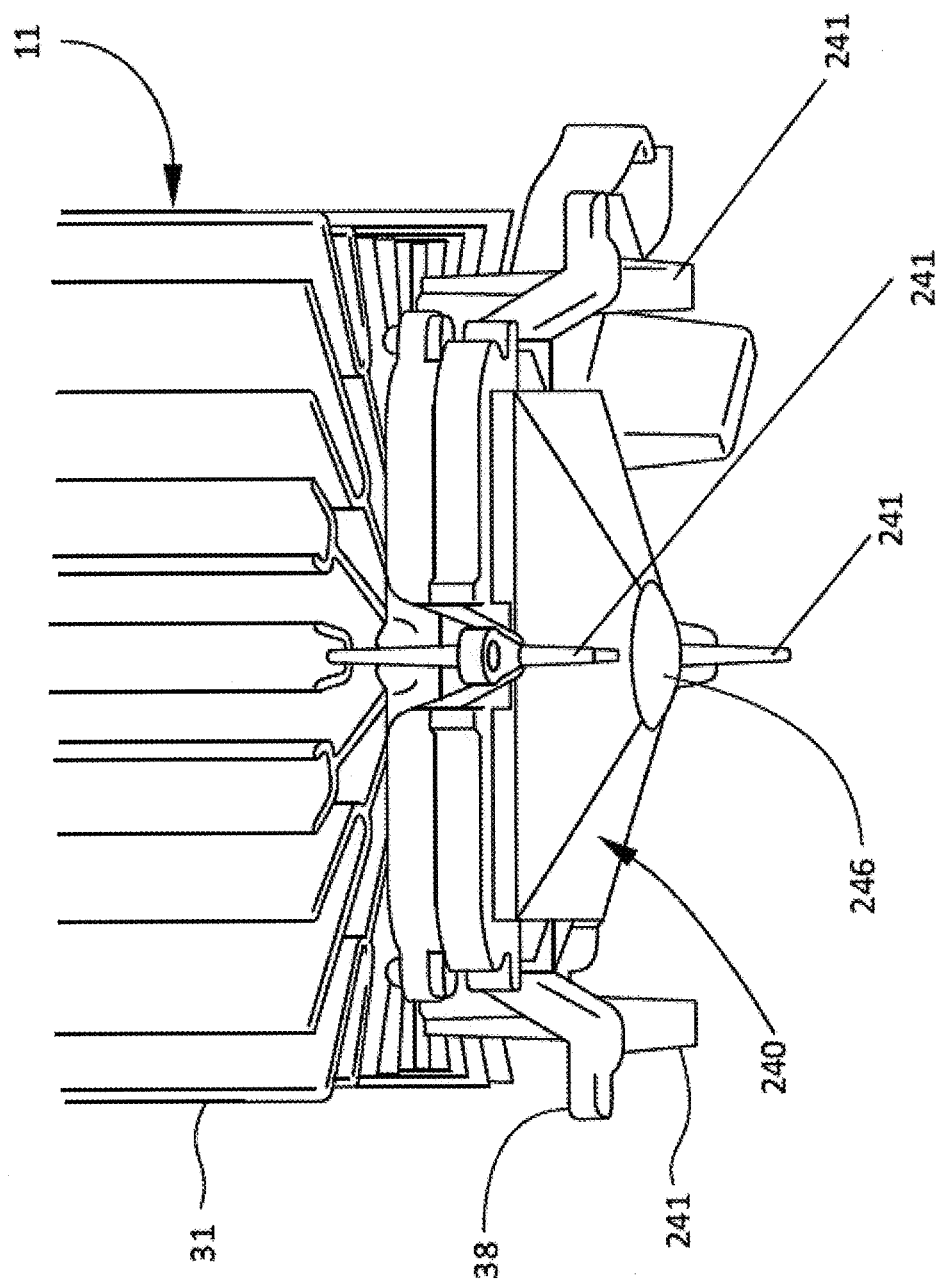
FIG. 23 illustrates a perspective view of a sensor module connecting directly with the driver assembly according to some embodiments.
Figure 24:
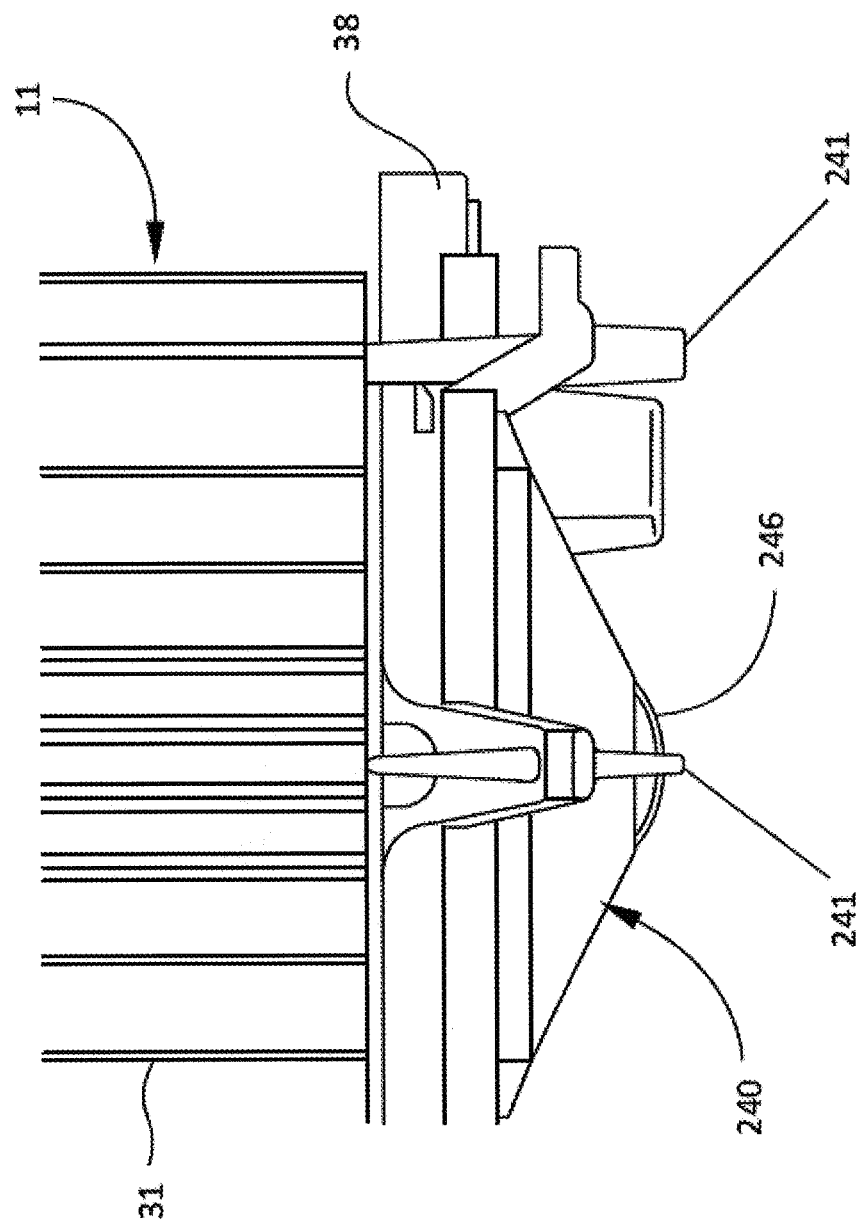
FIG. 24 provides an elevation view of the sensor assembly coupling to driver assembly via the endplate according to some embodiments.
Figure 25:
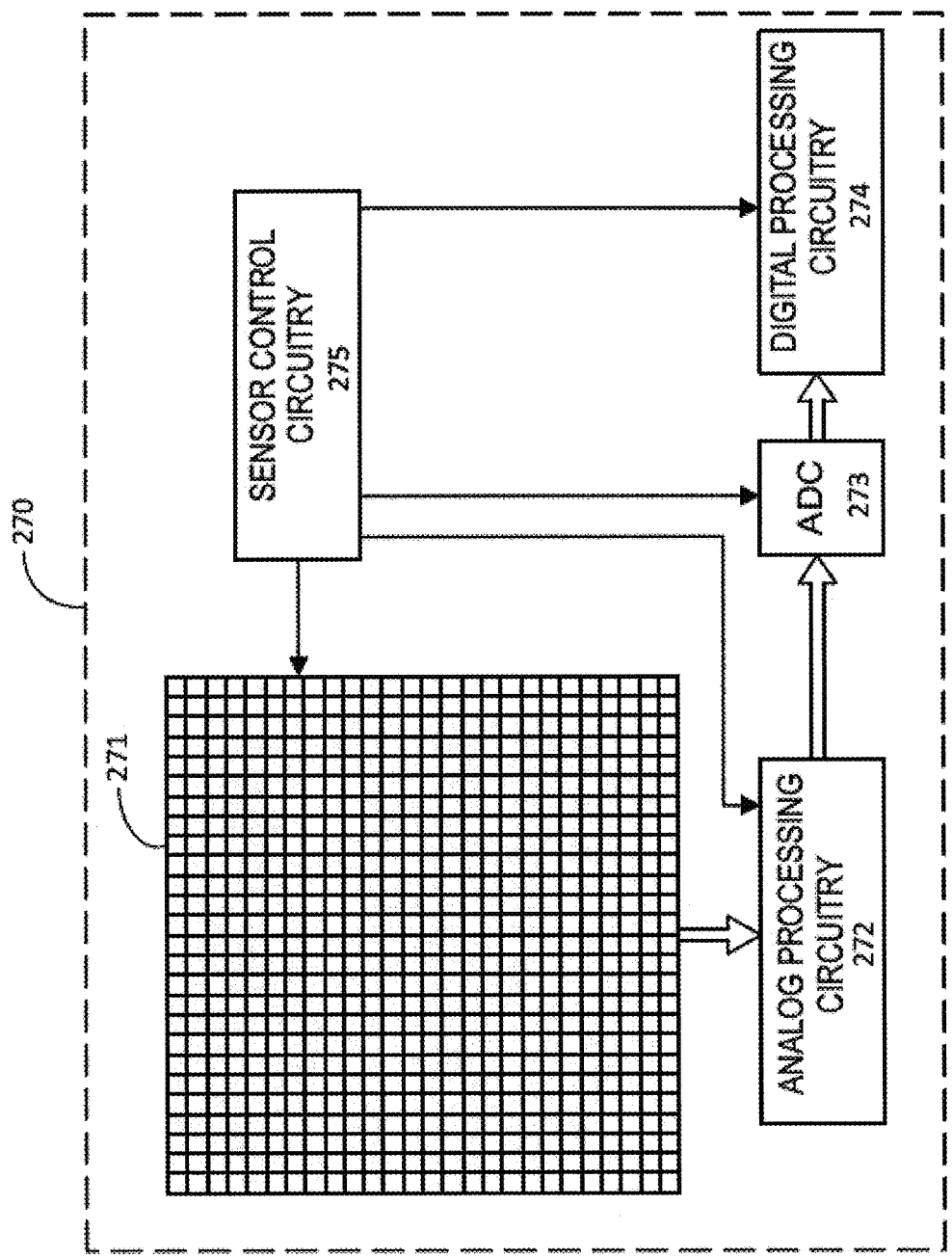
FIG. 25 illustrates details of a CMOS-based image sensor and associated processing according to some embodiments.

A sensor module may be integrated at any position in the luminaire not inconsistent with the objectives of the present invention. The sensor module, for example, can be integrated into the luminaire at a position at least partially overlapping the light emitting face. In some embodiments, the sensor module is positioned in an aperture of a light emitting diode assembly. Referring once again to FIG. 20, the sensor module may be positioned in the central aperture 51' of the LED assembly 51. The LED assembly 51 can comprise an array 63 of LEDs 66 as illustrated in FIG. 21. The central aperture 51' can be aligned with a heat sink 53 for the LED assembly 51 as illustrated in FIGS. 20 and 21. In some embodiments, the sensor module couples to the driver assembly of the luminaire FIG. 22 illustrates a perspective view of a sensor module connecting directly with the driver assembly according to some embodiments. As illustrated in FIG. 22, the sensor module 240 can couple to the endplate 38 of the driver assembly 11. The endplate 38 can also serve as a standoff from the driver heatsink 31 and thermally isolate the sensor module 240 from the driver assembly 11. The endplate 38 can comprise standoffs or feet 241 which can prevent damage to the sensor module 240 if set down on a hard surface during assembly of the luminaire or other application. In the embodiment of FIG. 22, the asymmetrical lens 248 is positioned over the primary lens assembly of the sensor module 240. FIG. 23 provides another perspective view of the sensor module 240 coupling directly with the driver assembly 11. In the embodiment of FIG. 25, a radiation transmissive domed structure 246 is positioned over the asymmetric lens 248 of the sensor module 240 as a protective covering. As described further herein, the domed structure 246 lies outside the focus range of the image sensor. FIG. 24 provides an elevation view of the sensor assembly 240 coupling to driver assembly 11 via the endplate 38. As illustrated in FIG. 24, the standoffs or feet 241 extend past the sensor module 240 and protective domed structure 246 for preventing damage to the sensor module 240 and/or LED array 63 if set down on a hard surface during assembly of the luminaire or other application.

In some embodiments, the LEDs of luminaires described herein may comprise packaged LED chip(s) or unpackaged LED chip(s). LED elements or modules of the panels can use LEDs of the same or different types and/or configurations. The LEDs can comprise single or multiple phosphor-converted white and/or color LEDs, and/or bare LED chip(s) mounted separately or together on a single substrate or package that comprises, for example, at least one phosphor-coated LED chip either alone or in combination with at least one color LED chip, such as a green LED, a yellow LED, a red LED, etc. The LED module can comprise phosphor-converted white or color LED chips and/or bare LED chips of the same or different colors mounted directly on a printed circuit board (e.g., chip on board) and/or packaged phosphor-converted white or color LEDs mounted on the printed circuit board, such as a metal core printed circuit board or FR4 board. In some embodiments, the LEDs can be mounted directly to the heat sink or another type of board or substrate. Depending on the embodiment, the lighting device can employ LED arrangements or lighting arrangements using remote phosphor technology as would be understood by one of ordinary skill in the art, and examples of remote phosphor technology are described in U.S. Pat. No. 7,614,759, assigned to the assignee of the present invention and hereby incorporated by reference.

In those cases where a soft white illumination with improved color rendering is to be produced, each LED element or module or a plurality of such elements or modules may include one or more blue shifted yellow LEDs and one or more red or red/orange LEDs as described in U.S. Pat. No. 7,213,940, assigned to the assignee of the present invention and hereby incorporated by reference. The LEDs may be disposed in different configurations and/or layouts as desired, for example utilizing single or multiple strings of LEDs where each string of LEDs comprise LED chips in series and/or parallel. Different color temperatures and appearances could be produced using other LED combinations of single and/or multiple LED chips packaged into discrete packages and/or directly mounted to a printed circuit board as a chip-on board arrangement. In one embodiment, the light source comprises any LED, for example, an XP-Q LED incorporating TrueWhite® LED technology or as disclosed in U.S. patent application Ser. No. 13/649,067, filed Oct. 10, 2012, entitled "LED Package with Multiple Element Light Source and Encapsulant Having Planar Surfaces" by Lowes et al., the disclosure of which is hereby incorporated by reference herein, as developed and manufactured by Cree, Inc., the assignee of the present application. If desirable, other LED arrangements are possible. In some embodiments, a string, a group of LEDs or individual LEDs can comprise different lighting characteristics and by independently controlling a string, a group of LEDs or individual LEDs, characteristics of the overall light out output of the device can be controlled.

In some embodiments, each LED element or module may comprise one or more LEDs disposed within a coupling cavity with an air gap being disposed between the LED element or module and a light input surface. In any of the embodiments disclosed herein each of the LED element(s) or module(s) can have different or the same light distribution, although each may have a directional emission distribution (e.g., a side emitting distribution), as necessary or desirable. More generally, any lambertian, symmetric, wide angle, preferential-sided or asymmetric beam pattern LED element(s) or module(s) may be used as the light source.

As described herein, the asymmetric lens alters field of view of an image senor module to less than or equal to an acceptance angle of a luminaire integrating the sensor module. In some embodiments, the imaged field of view may experience distortion and/or other artifacts. Such distortion and/or artifacts may be removed during signal and image processing. Details of a CMOS-based image sensor and associated processing are illustrated in the non-limiting embodiment of FIG. 25. While a CMOS-based image sensor 270 is illustrated, those skilled in the art will appreciate that other types of image sensors, such as CCD-based sensors, may be employed. The image sensor 270 generally includes a pixel array 271, analog processing circuitry 272, an analog-to-digital converter (ADC) 273, digital processing circuitry 274 and sensor control circuitry 275. In operation, the pixel array 271 will transform light that is detected at each pixel into an analog signal and pass the analog signal for each pixel of the array 271 to the analogy processing circuitry 272. The analog processing circuitry 272 will filter and amplify the analog signals to create amplified signals, which are converted to digital signals by the ADC 273. The digital signals are processed by the digital processing circuitry 274 to create image data corresponding to the captured image.

The sensor control circuitry 275 will cause the pixel array 271 to capture an image in response to an instruction, for example, from a control system. The sensor control circuitry 275 controls the timing of the image processing provided by the analog processing circuitry 272, the ADC 273 and the digital processing circuitry 274. The sensor control circuitry 275 also sets the image sensor's processing parameters, such as the gain and nature of filtering provided by the analog processing circuitry 272 as well as the type of image processing provided by the digital processing circuitry 274.

Figure 26:
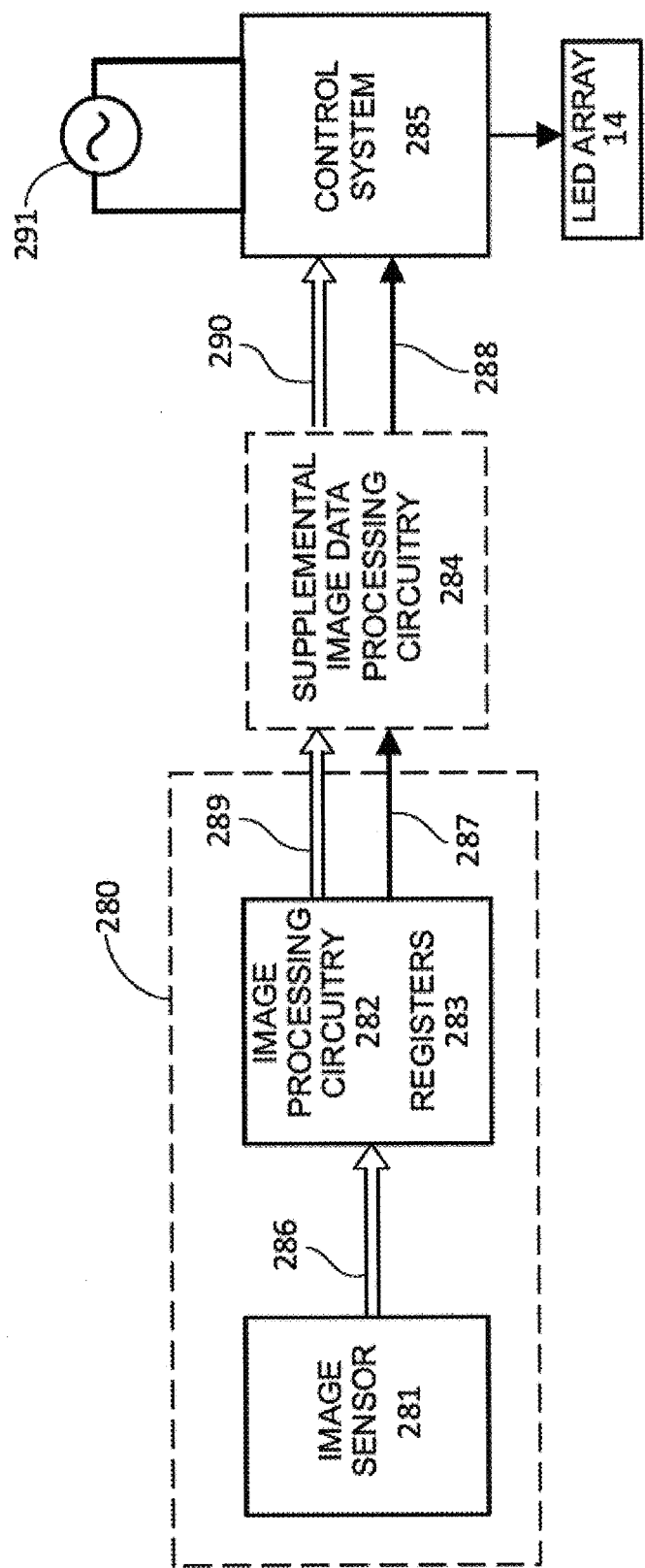
FIG. 26 illustrates an electrical block diagram of a luminaire employing a sensor module comprising an image sensor according to some embodiments.

FIG. 26 illustrates an electrical block diagram of a luminaire employing a sensor module 280 comprising an image sensor 281 according to some embodiments. The sensor module 280 also comprises image processing circuitry 282, which in turn includes a number of registers 283, optional supplemental image data processing circuitry 284, a control system 285 and the LED array 14. The sensor module 280 may be a system on chip (SoC) in which the image sensor 281 and processing circuitry 282 are integrated onto a single chip. The supplemental image processing circuitry 284 may be provided either together or separately from the sensor module 280. The supplemental image data processing circuitry 284 may be used to offload computations related to image data and/or derived image data that cannot be processed by the image processing circuitry 282.

In operation, the image sensor 281 is configured to capture images as described above. The data from these images is sent to the image processing circuitry 282. In the embodiment of FIG. 28, the image data is sent via a high speed bus 286. The image processing circuitry 282 may perform a number of operations on the imaged data, including filtering and adjusting the image data. In some embodiments, the image processing circuitry may address signal generated by light reflected from one or more optics of the luminaire and/or signal generated by other environmental artifacts. For example, the image processing circuitry can remove or exclude signal generated by light reflected from a glare shield employed in the luminaire architecture. The image processing may also remove any image distortion introduced by the asymmetrical lens.

Further, the image processing circuitry 282 may determine derived image data from the image data. In general, the derived image data is a downsampled form of the image data. The derived image data may be provided in the normal course of operation of the sensor module 280. The supplemental image data processing circuitry 284 may perform one or more computations on the derived image data to determine an ambient light level and/or occupancy event. However, these computations may also be performed directly by the control system 285. Using the derived image data may allow the supplemental image data processing circuitry to use a first low-speed bus 287 to communicate with the image processing circuitry 282. Similarly, it may also enable the control system to communicate with a second low speed bus 288 with the supplemental image data processing circuitry 284 and/or directly with the image processing circuitry 282. This is due to the fact that the derived image data is downsampled when compared to the actual image data and, therefore, can be transferred quickly when compared to the actual image data. In situations wherein the derived image data is insufficient to accurately characterize the area surrounding the luminaire, the full image data may be transferred from the image processing circuitry 282 to the supplemental image data processing circuitry 284 via a second high speed bus 289 for further review. The image data may then be processed by the supplemental image data processing circuitry 284 and the necessary data sent via the second low speed bus 288 to the control system 285, or the full image data may also be sent to the control system 285, either directly from the image processing circuitry 282 via a third high speed bus 290 or indirectly from the supplemental image data processing circuitry 284 via the third high-speed bus 290.

The first high-speed bus 286, the second high-speed bus 289 and the third high-speed bus 290 may be a universal serial bus (USB), a peripheral component interconnect (PCI), an external serial advanced attachment (eSATA) bus of the like. The first low-speed bus 287 and second low-speed bus 288 may be any number of low-speed buses known in the art. For example, the first low-speed bus 287 and second low-speed bus 288 may be an RS-232 bus, a serial peripheral interface (SPI), a $I^2C$ bus or the like.

The control system 285 may use the image data and/or the derived image data to adjust one or more light output characteristics of the LED array 14. For example, the control system 285 can use the image data and/or derived image data to adjust color temperature, light intensity, color, vividness or the like of the light output by the LED array 14. An alternating current (AC) power source 291 may provide power for the control system 285 and LED array 14. Additional features of a sensor module comprising an image sensor and associated image processing are further described in U.S. patent application Ser. No. 14/928,592 Nov. 5, 2015, entitled "Lighting Fixture with Image Sensor Module", which is incorporated herein by reference in its entirety.

In some embodiments, the sensor module can also comprise radio frequency (rf) communication apparatus. The luminaire, for example, can be part of a wireless distributed lighting network. For example, luminaires of the network may communicate with one another via Institute of Electrical and Electronic Engineers standard 802.15 or some variant thereof. Using a wireless mesh network to communicate between luminaires may increase the reliability thereof and allow the wireless lighting network to span large areas. Examples of luminaires and wireless network architectures employing rf communication are provided in U.S. patent application Ser. No. 62/292,528, titled Distributed Lighting Network referenced above. When rf communication apparatus is included in the sensor module, rf-transmissive materials are can be employed in the construction of luminaire component(s) so as not to interfere with rf transmission or reception. For example, one or more luminaire optics are constructed of rf-transmissive material. In some embodiments, a glare shield can be fully or partially constructed of rf-transmissive material, such as polymeric material. FIG. 19 illustrates one embodiment wherein the glare shield is provided as upper 222 and lower 223 segments. Depending on position of the rf communication apparatus in the light emitting face of the luminaire, one or both segments 222, 223 of the glare shield can be formed of a suitable rf-transmissive material. In some embodiments, rf-transmissive windows are provided in luminaire optics, such as the glare shield. In additional embodiments, a segment of the glare shield can be constructed of metal, wherein the metal segment is employed as an antenna for propagation of rf signal to and/or from the rf-communication module.

In various embodiments described herein various smart technologies may be incorporated in the lamps as described in the following applications "Solid State Lighting Switches and Fixtures Providing Selectively Linked Dimming and Color Control and Methods of Operating," application Ser. No. 13/295,609, filed Nov. 14, 2011, which is incorporated by reference herein in its entirety; "Master/Slave Arrangement for Lighting Fixture Modules," application Ser. No. 13/782,096, filed Mar. 1, 2013, which is incorporated by reference herein in its entirety; "Lighting Fixture for Automated Grouping," application Ser. No. 13/782,022, filed Mar. 1, 2013, which is incorporated by reference herein in its entirety; "Multi-Agent Intelligent Lighting System," application Ser. No. 13/782,040, filed Mar. 1, 2013, which is incorporated by reference herein in its entirety; "Routing Table Improvements for Wireless Lighting Networks," application Ser. No. 13/782,053, filed Mar. 1, 2013, which is incorporated by reference herein in its entirety; "Commissioning Device for Multi-Node Sensor and Control Networks," application Ser. No. 13/782,068, filed Mar. 1, 2013, which is incorporated by reference herein in its entirety; "Wireless Network Initialization for Lighting Systems," application Ser. No. 13/782,078, filed Mar. 1, 2013, which is incorporated by reference herein in its entirety; "Commissioning for a Lighting Network," application Ser. No. 13/782,131, filed Mar. 1, 2013, which is incorporated by reference herein in its entirety; "Ambient Light Monitoring in a Lighting Fixture," application Ser. No. 13/838,398, filed Mar. 15, 2013, which is incorporated by reference herein in its entirety; "System, Devices and Methods for Controlling One or More Lights," application Ser. No. 14/052,336, filed Oct. 10, 2013, which is incorporated by reference herein in its entirety; and "Enhanced Network Lighting," Application No. 61/932,058, filed Jan. 27, 2014, which is incorporated by reference herein in its entirety.

Additionally, any of the luminaire embodiments described herein can include the smart lighting control technologies disclosed in U.S. Patent Application Ser. No. 62/292,528, titled Distributed Lighting Network, filed concurrently herewith on Feb. 8, 2016 and assigned to the same assignee as the present application, the entirety of this application being incorporated herein by reference.

Any of the embodiments disclosed herein may be used in a luminaire having one or more communication components forming a part of the light control circuitry, such as an RF antenna that senses RF energy. The communication components may be included, for example, to allow the luminaire to communicate with other luminaires and/or with an external wireless controller, such as disclosed in U.S. patent application Ser. No. 13/782,040, filed Mar. 1, 2013, entitled "Lighting Fixture for Distributed Control" or U.S. Provisional Application No. 61/932,058, filed Jan. 27, 2014, entitled "Enhanced Network Lighting" both owned by the assignee of the present application and the disclosures of which are incorporated by reference herein. More generally, the control circuitry can include at least one of a network component, an RF component, a control component, and one or more sensors. A sensor, such as a knob-shaped sensor, may provide an indication of ambient lighting levels and/or occupancy within the room or illuminated area.

The invention claimed is:

1. An asymmetrical lens of an image sensor module comprising:
   an optical axis;
   a front surface comprising a first set of normal axes (x, y) in a plane normal to the optical axis and a negative radius of curvature or positive radius of curvature along each of the normal axes (x, y); and
   a back surface comprising a second set of normal axes (x',y') in the plane normal to the optical axis and a negative radius of curvature or positive radius of curvature along each of the normal axes (x',y'),
   wherein the asymmetrical lens has positive refractive power in the x-axis and negative refractive power in the y-axis of the image plane of the asymmetrical lens,
   wherein refractive power in the x-axis and the y-axis of the image plane differ, and
   wherein the front surface comprises a negative radius of curvature normal to a positive radius of curvature along the first set of normal axes (x, y) and the back surface comprise a negative radius of curvature normal to a positive radius of curvature along the second set of normal axes (x', y').

2. The asymmetrical lens of claim 1, wherein the front surface comprises negative radius of curvature along each of the first set of normal axes (x, y) and the back surfaces comprises negative radius of curvature along each of the second set of normal axes (x',y').

3. The asymmetrical lens of claim 2, wherein negative radius of curvature differs between the normal axes (x, y) of the first set.

4. The asymmetrical lens of claim 3, wherein negative radius of curvature differs between the normal axes (x', y') of the second set.

5. The asymmetrical lens of claim 1 comprising a lens center thickness of $0.007<d_1/L<0.2$, where $d_1$ is center thickness of the asymmetric lens and L is total track length of the asymmetrical lens and a primary lens assembly of the image sensor module.

6. The asymmetrical lens of claim 1, wherein the front surface of the asymmetrical lens comprises conic constants differing in normal orientations.

7. The asymmetrical lens of claim 6, wherein the conic constants each have a value from −1 to 1.

8. The asymmetrical lens of claim 1, wherein the back surface of the asymmetrical lens comprises conic constants differing in normal orientations.

9. The asymmetrical lens of claim 8, wherein the conic constants each have a value from −1 to 1.

10. An asymmetrical lens of an image sensor module comprising:
    an optical axis;
    a front surface comprising a first set of normal axes (x, y) in a plane normal to the optical axis and a negative radius of curvature or positive radius of curvature along each of the normal axes (x, y); and
    a back surface comprising a second set of normal axes (x',y') in the plane normal to the optical axis and a negative radius of curvature or positive radius of curvature along each of the normal axes (x',y'),
    wherein the asymmetrical lens has negative refractive power in both the x-axis and y-axis of the image plane of the asymmetrical lens, and
    wherein negative refractive power range in both the x-axis and y-axis of the image plane are $-300<fx/F<-8$, $-100<fy/F<-5$, wherein fx and fy are the focal length of the asymmetric lens in the x-axis and y-axis of the image plane, respectively, and F is focal length of the primary lens assembly of the image sensor module.

11. The asymmetrical lens of claim 10, wherein the primary lens assembly comprises two or more rotationally symmetric lenses.

12. The asymmetrical lens of claim 10, wherein the front surface comprises negative radius of curvature along each of the first set of normal axes (x, y) and the back surfaces comprises negative radius of curvature along each of the second set of normal axes (x',y').

13. The asymmetrical lens of claim 12, wherein negative radius of curvature differs between the normal axes (x, y) of the first set.

14. The asymmetrical lens of claim 13, wherein negative radius of curvature differs between the normal axes (x', y') of the second set.

15. The asymmetrical lens of claim 10 comprising a lens center thickness of $0.007<d_1/L<0.2$, where $d_1$ is center thickness of the asymmetric lens and L is total track length of the asymmetrical lens and a primary lens assembly of the image sensor module.

16. The asymmetrical lens of claim 10, wherein the front surface of the asymmetrical lens comprises conic constants differing in normal orientations.

17. The asymmetrical lens of claim 16, wherein the conic constants each have a value from −1 to 1.

18. The asymmetrical lens of claim 10, wherein the back surface of the asymmetrical lens comprises conic constants differing in normal orientations.

19. The asymmetrical lens of claim 18, wherein the conic constants each have a value from −1 to 1.

20. An asymmetrical lens of an image sensor module comprising:
    an optical axis;
    a front surface comprising a first set of normal axes (x, y) in a plane normal to the optical axis and a negative radius of curvature or positive radius of curvature along each of the normal axes (x, y); and a back surface comprising a second set of normal axes (x',y') in the plane normal to the optical axis and a negative radius of curvature or positive radius of curvature along each of the normal axes (x',y'), wherein the asymmetrical lens has positive refractive power in the x-axis and negative refractive power in the y-axis of the image plane of the asymmetrical lens, wherein refractive power in the x-axis and the y-axis of the image plane differ, wherein positive refractive power range in the x-axis of the image plane is $10<fx/F<5000$ and negative refractive power range in the y-axis of the image plane is $-100<fy/F<-5$, where fx and fy are the focal length of the asymmetric lens in the x-axis and y-axis of the image plane, respectively, and F is the focal length of a primary lens assembly of the image sensor module.

21. The asymmetrical lens of claim 20, wherein the front surface comprises negative radius of curvature along each of the first set of normal axes (x, y) and the back surfaces comprises negative radius of curvature along each of the second set of normal axes (x',y').

22. The asymmetrical lens of claim 21, wherein negative radius of curvature differs between the normal axes (x, y) of the first set.

23. The asymmetrical lens of claim 22, wherein negative radius of curvature differs between the normal axes (x', y') of the second set.

24. The asymmetrical lens of claim 20 comprising a lens center thickness of $0.007<d_1/L<0.2$, where $d_1$ is center thickness of the asymmetric lens and L is total track length of the asymmetrical lens and a primary lens assembly of the image sensor module.

25. The asymmetrical lens of claim 20, wherein the front surface of the asymmetrical lens comprises conic constants differing in normal orientations.

26. The asymmetrical lens of claim 25, wherein the conic constants each have a value from −1 to 1.

27. The asymmetrical lens of claim 20, wherein the back surface of the asymmetrical lens comprises conic constants differing in normal orientations.

28. The asymmetrical lens of claim 27, wherein the conic constants each have a value from −1 to 1.

\* \* \* \* \*